(12) United States Patent
Hence

(10) Patent No.: US 11,014,492 B2
(45) Date of Patent: May 25, 2021

(54) WIRE-FREE SYSTEM AND METHOD FOR SIGNALING DECELERATION IN VEHICLES

(71) Applicant: Roland Alexander Hence, Cambridge, MA (US)

(72) Inventor: Roland Alexander Hence, Cambridge, MA (US)

( * ) Notice: Subject to any disclaimer, the term of this patent is extended or adjusted under 35 U.S.C. 154(b) by 149 days.

(21) Appl. No.: 16/371,845

(22) Filed: Apr. 1, 2019

(65) Prior Publication Data

US 2020/0307446 A1 Oct. 1, 2020

(51) Int. Cl.
*B60Q 1/44* (2006.01)
*B60Q 1/54* (2006.01)
*F21S 43/00* (2018.01)
*F21V 23/04* (2006.01)

(52) U.S. Cl.
CPC .............. *B60Q 1/44* (2013.01); *B60Q 1/54* (2013.01); *F21S 43/00* (2018.01); *F21V 23/0492* (2013.01)

(58) Field of Classification Search
CPC ........... F21S 43/14; F21S 43/26; F21V 14/02; F21V 23/0492; F21W 2103/30; F21W 2103/35; F21W 2103/40; F21W 2103/45; F21Y 2103/10
See application file for complete search history.

(56) References Cited

U.S. PATENT DOCUMENTS

| | | | |
|---|---|---|---|
| 4,449,167 A | 5/1984 | Cohen | |
| 4,651,129 A | 3/1987 | Wood | |
| 5,103,382 A * | 4/1992 | Kondo | B60Q 1/302 362/249.04 |
| 5,345,218 A | 9/1994 | Woods | |
| 5,438,487 A * | 8/1995 | Schmid | B60Q 1/302 33/288 |
| 5,821,851 A * | 10/1998 | Blackmer | B60Q 1/447 340/467 |
| 6,023,221 A | 2/2000 | Michelotti | |
| 6,124,647 A * | 9/2000 | Marcus | B60C 23/0401 307/10.1 |
| 7,154,387 B2 | 12/2006 | Boomershine, III | |
| 7,705,720 B2 | 4/2010 | Jachmann | |
| 9,487,131 B2 | 11/2016 | Neufeglise | |
| 9,908,461 B2 | 3/2018 | Gasper | |
| 2004/0160315 A1* | 8/2004 | Speckhart | B60Q 1/447 340/467 |

(Continued)

FOREIGN PATENT DOCUMENTS

ES 20170030829 12/2018

OTHER PUBLICATIONS

STMicroelectronics, "g-Brake Lights: an adaptive rear lighting system based on the AIS326DQ inertial sensor and the STM8AF5168 MCU", AN3288 Application note, 2010, Rev 2, STMicroelectronics (Year: 2010).*

(Continued)

*Primary Examiner* — Zheng Song

(57) ABSTRACT

A system for signaling vehicle deceleration having an acceleration sensor, processor, lamp controller, power supply, mount, and lamp. The acceleration sensor gathers acceleration data of the vehicle, and the processor interprets the acceleration data gathered. If, based on that data, the processor determines that the vehicle is decelerating beyond a preset threshold, the processor powers the lamp via the lamp controller. The system adjusts for various orientations and positions of installment.

25 Claims, 13 Drawing Sheets

(56) References Cited

U.S. PATENT DOCUMENTS

| | | | | |
|---|---|---|---|---|
| 2004/0246737 A1* | 12/2004 | Voelker | | B60Q 1/302 |
| | | | | 362/503 |
| 2006/0273891 A1 | 12/2006 | Quach | | |
| 2007/0008095 A1* | 1/2007 | Gwinn | | B60Q 1/444 |
| | | | | 340/476 |
| 2007/0063831 A1* | 3/2007 | Perkins | | B62J 6/05 |
| | | | | 340/479 |
| 2014/0070937 A1* | 3/2014 | Anderson | | B60Q 1/447 |
| | | | | 340/464 |
| 2014/0354422 A1 | 12/2014 | Olson et al. | | |
| 2015/0197182 A1* | 7/2015 | Jones | | B60Q 1/444 |
| | | | | 340/908 |
| 2016/0027350 A1* | 1/2016 | Stockton | | B60Q 1/268 |
| | | | | 40/544 |
| 2017/0080852 A1* | 3/2017 | Shanahan | | B60Q 1/34 |
| 2019/0143888 A1* | 5/2019 | Schaye | | F21S 43/15 |
| | | | | 315/79 |
| 2019/0217769 A1* | 7/2019 | Nekic | | B60Q 1/38 |
| 2019/0241120 A1* | 8/2019 | Locey | | B60T 8/329 |
| 2019/0359119 A1* | 11/2019 | Brouillard-Turgeon | | |
| | | | | B60Q 1/085 |
| 2020/0124260 A1* | 4/2020 | Pena | | F21S 8/04 |

OTHER PUBLICATIONS

STMicroelectronics, "g-Brake Lights: an adaptive rear lighting system based on the AIS326DQ inertial sensor and the STM8AF5168 MCU", AN3288 Application note, 2010, Rev 2, STMicroelectronics.

* cited by examiner

WIRE-FREE SYSTEM AND METHOD FOR SIGNALING DECELERATION IN VEHICLES

CROSS REFERENCE TO RELATED APPLICATIONS

Not Applicable

FIELD

The invention generally relates to an apparatus and method to signal deceleration in a vehicle.

BACKGROUND OF THE INVENTION

Each year, there are millions of rear-end collisions—a devastating type of car crash that is primarily caused by a following driver reacting too slowly to a vehicle's deceleration—otherwise known as braking. Normally, a vehicle's brake light is designed to alert following drivers to such braking. However, drivers often still do not react fast enough to avoid a crash. As a result, the market needs a technology that can improve upon existing brake lights: an enhanced, aftermarket brake light that improves safety by getting the attention of a following driver more quickly.

There is great potential for this type of brake light enhancement: studies show that by simply brightly pulsing—or flashing—a brake light at 5 hz upon rapid braking, following drivers can react far faster to a decelerating lead vehicle than they would if the lead vehicle had a normal, factory brake light. Since factory installed brake lights become outdated quickly, aftermarket brake light enhancements have the potential to help drivers add this type of cutting-edge safety to their vehicles. However, for any aftermarket technology to realize its commercial potential, it must be simple to install, easy to operate, and effective. If it is not simple to install, many drivers will be unable or unwilling to add the technology to their vehicle. If it is not easy to operate, drivers will have to interact with their car more, either through physical manipulation or mental consideration, both of which are a burden drivers would rather avoid. If it is not effective, there is no benefit to the cost.

Aftermarket brake light enhancements generally fall into two categories: wired and wireless systems. Wired systems tap into some portion of the existing brake light system of the vehicle. Often, this means connecting to the power lines of the brake light. Then, the system modifies the existing brake light on the vehicle by regulating the power it receives. This enables a brake light to flash or dim, rather than simply turn on or off with the brake pedal. On the other hand, wireless systems do not rely entirely on the existing brake system of the vehicle. Often, they use a separate power supply or accelerometer to provide power to lights and to sense the vehicle's braking, respectively. However, the automotive environment is particularly harsh; damage and wear can be caused by passengers, high heat, and intense vibration. Altering the vehicle's wiring or panelling can void factory warranties, and if the driver is affected by any changes to the vehicle, the driver's visibility can be impaired resulting in reduced safety. As a result, all aftermarket brake light enhancements are severely limited by some combination of three problems: a complicated installation, an inconvenient operation, and an ineffective signalling of deceleration.

Having an aftermarket product with a complicated installation is detrimental to the commercial value of the product because such complexity makes the driver less likely to perform a successful installation. The driver may not even attempt to have the product installed on their vehicle. Wired systems are particularly complex as they require using tools, removing vehicle panelling to access wires, stripping wires, and connecting wires. Such steps require extensive electromechanical knowledge that should only be undertaken by professionals. Additionally, since vehicles vary greatly, each vehicle may need its own set of installation instructions. Since the product is such that a professional must be hired at time and cost, this reduces the likelihood that a driver will want to go through the effort to install the product, thereby decreasing the product's commercial value and potential to add safety.

Once an aftermarket brake light system is installed, it is often inconvenient to operate. Wired systems are usually tucked away in the panelling of the vehicle, so any further adjustments or servicing will once again require the assistance of a professional at time and cost. Wireless systems are vulnerable to harsh driving environments such as road imperfections and vibration. Additionally, occupants of the vehicle may accidentally bump the wireless system, causing damage and inadvertent adjustments to settings. As a result, these aftermarket systems must be serviced and maintained regularly to so they can survive these intense conditions. Finally, since all aftermarket technologies must be affixed to the vehicle as an add-on, the driver's visibility through the rearview mirror is negatively affected. As a result, aftermarket brake light enhancements are inconvenient as they require inconvenient servicing and consideration during normal operation.

Lastly, these technologies are ineffective at signalling deceleration. Wired systems are limited to the location, size, and maximum brightness of the existing brake light of the vehicle. Wireless systems provide a light output to the following driver that is limited. This is a problem for drivers, as the purpose of an aftermarket brake light enhancement is to add safety through more effective signaling of the vehicle's deceleration.

All aftermarket brake light enhancements fall into at least one category of: complicated to install, inconvenient to operate, or ineffective at signalling. However, the invention of this disclosure solves all three of these problems.

BRIEF SUMMARY OF THE INVENTION

The disclosed invention is a brake light enhancement that is comprised of an apparatus and a process. The apparatus secures to the inside of the rear window of the vehicle and is easy to install, convenient to operate, and an effective signal to the following driver. Meanwhile, the process installs the apparatus, determines deceleration of the vehicle, and activates a brake lamp accordingly.

The apparatus is capable of determining the vehicle's deceleration and responding by signaling the following driver. It has its own housing, power supply, acceleration sensor, processing circuitry, and brake light. Additionally, it has a simple means of adjusting its acceleration sensor, processing circuitry, and brake light to accommodate a wide variety of vehicles and driving situations. This means it is portable, can sense when braking is occurring, and respond accordingly, all without connecting to the vehicle's existing brake light system. As such, this invention increases vehicle safety by enhancing brake light technology, thereby solving a problem for many drivers and generating commercial value in the process.

Installation is simple. The apparatus secures to a vehicle's window without any tools. It has no external wiring, meaning that the installation is not intrusive as the vehicle's wiring systems are unaffected and so the vehicle's panelling does not need to be removed to access any vehicle wires. Additionally, the apparatus can accommodate a wide variety of rear window orientations and tints. As such, no technical experience is needed for installation, and the apparatus works for a wide variety of vehicles, which means the average person can install the apparatus with ease.

It is convenient to operate the apparatus as it is protected and robust. Impact resulting from contact with passengers has minimal effect. Regardless of the driving conditions, which can be extremely trying, the apparatus is robust such that it need not be removed from the vehicle, nor serviced additionally. Finally, the housing of the apparatus is such that the driver's visibility through the rear window will not be impaired. As a result, the invention has convenient operation.

Finally, the signal that indicates deceleration is effective via improved light characteristics. The apparatus is visible through the rear window regardless of window tinting, while still compliant with local laws. Additionally, the apparatus further adjusts to accommodate a wide variety of angles of rear window by redirecting the light output of the brake light to face the following driver. Also, since the apparatus has its own brake lamp, such lamp is optically supplemental to the vehicle's existing brake light system. This increases the effective projected luminous lens area of the vehicle's total brake lights, thereby improving visibility to following drivers. Finally, the apparatus does not need to only illuminate the brake lamp in a steady pattern; light output can be arranged in a wide variety of patterns that are pre-programmed. As a result of such flexibility, the apparatus is effective at signalling a deceleration of the vehicle.

Aftermarket brake light enhancements have previously been difficult to install, inconvenient to operate, or ineffective at signalling deceleration—often a combination of all three. Through the disclosed invention, a solution to these problems is realized. In one embodiment of the invention, the brake lamp pivots at least partially within a housing capable of being mounted to a rear window of a vehicle. In doing so, the apparatus accommodates rear windows that do not rest in a vertical orientation and is protected from accidental rotation that is caused by impact. In another embodiment, the apparatus has an alternative type of ruggedized power supply within a housing that is capable of being secured to the rear window. This makes operation convenient as the apparatus is safe for use in a location that is both vulnerable and dangerous to passengers. Finally, in another embodiment, a method describes the simple installation and operation of the apparatus. These are three embodiments disclosed, however it will be appreciated by those of ordinary skill in the art that such embodiments can be combined, and alternative embodiments of this invention exist beyond these so listed.

DETAILED DESCRIPTION OF THE INVENTION

The following refers to the best mode of the invention: an apparatus 42 that installs to the interior 48 of a rear-window 43 of a vehicle 44. However, it will be appreciated that the flexible design allows for a variety of functionality and design alterations to suit a particular application. Some such alternatives will be discussed as well. The vehicle 44 has an operator who is often referred to as the driver of the vehicle 44. A person who installs the apparatus 42 is referred to as the user of the apparatus 42, and said user may also be the driver or operator of the vehicle 44. The vehicle 44 may also have additional occupants, otherwise referred to as passengers.

Figure 1:
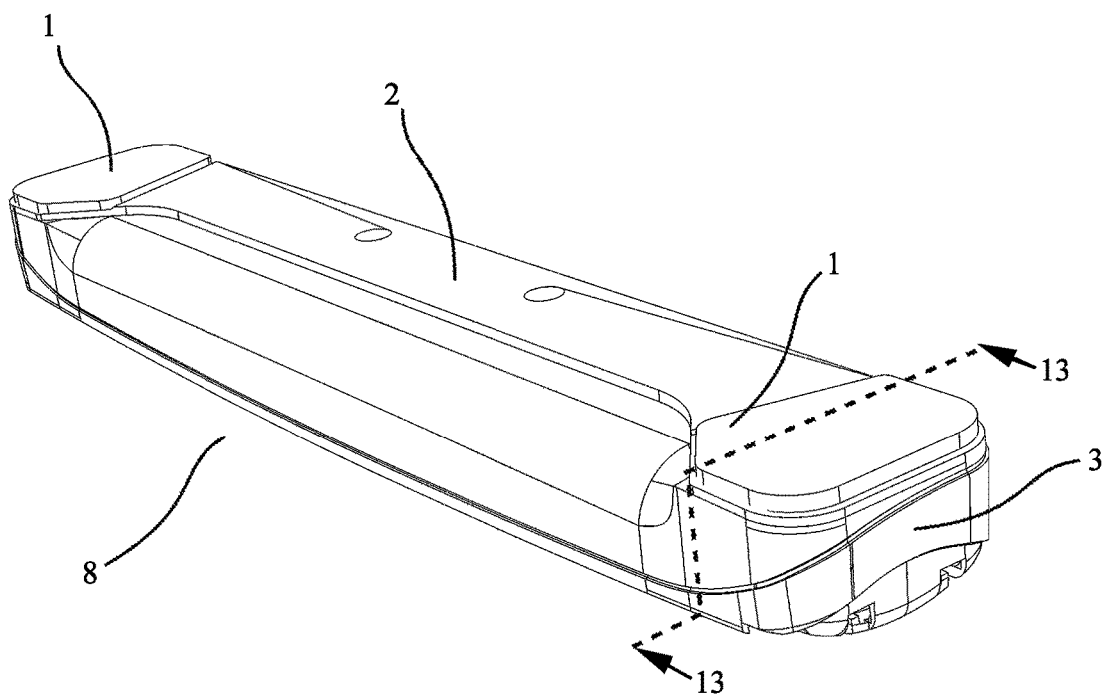
FIG. 1 is a wireframe, perspective view of an exemplary embodiment of the apparatus.

FIG. 1 is a wireframe, perspective view of the exemplary apparatus 42 for signaling a deceleration event of the vehicle 44. A deceleration event is any occasion where the vehicle 44 slows, often caused deliberately by the driver of the vehicle 44 through application of the brakes of the vehicle 44. In this exemplary embodiment, the apparatus 42 has a front housing 3 and a back housing 2, which, together, collectively form the housing 8. Having two distinct halves of the housing 8 may simplify the manufacturing process. However, the housing 8 may alternatively be comprised of one or more pieces, and the arrangement of such pieces may be different than is so depicted in this exemplary embodiment. The housing 8 may be manufactured out of Acrylonitrile Butadiene Styrene (ABS) or polycarbonate (PC) plastic. In the best mode, the back housing 2 is manufactured out of a transparent PC plastic to permit emissions from a brake lamp 37 to pass through while still providing said brake lamp 37 protection via the housing 8.

Two adhesive pads 1 enable the apparatus 42 to secure to the surface of a vehicle 44. Such surface may be a portion of the interior 48 or exterior 47 of a rear window 43. In this exemplary embodiment, the apparatus 42 is installed near the top 402 of the rear window 43, as this location minimizes the impact on the driver's visibility through the rear window 43. Likewise, this position at the top 402 of the rear window 43 maximizes the distance 406 between the direction of light output 25 of the apparatus 42 and the road surface 46. This location is particularly beneficial in making the light output of the brake lamp 37 easily visible to the driver of a following vehicle 404 by making the direction of light output 25 of the brake lamp 37 more closely aligned with the following driver's line-of-sight 405.

The adhesive pads 1 enable the apparatus to install to a surface in few steps. By using a high temperature, conformable adhesive, the adhesive pads 1 will enable the apparatus 42 to install to the rear window 43 robustly but will still be non-damaging during possible removal. A sectional view is available in FIG. 13.

Figure 2:
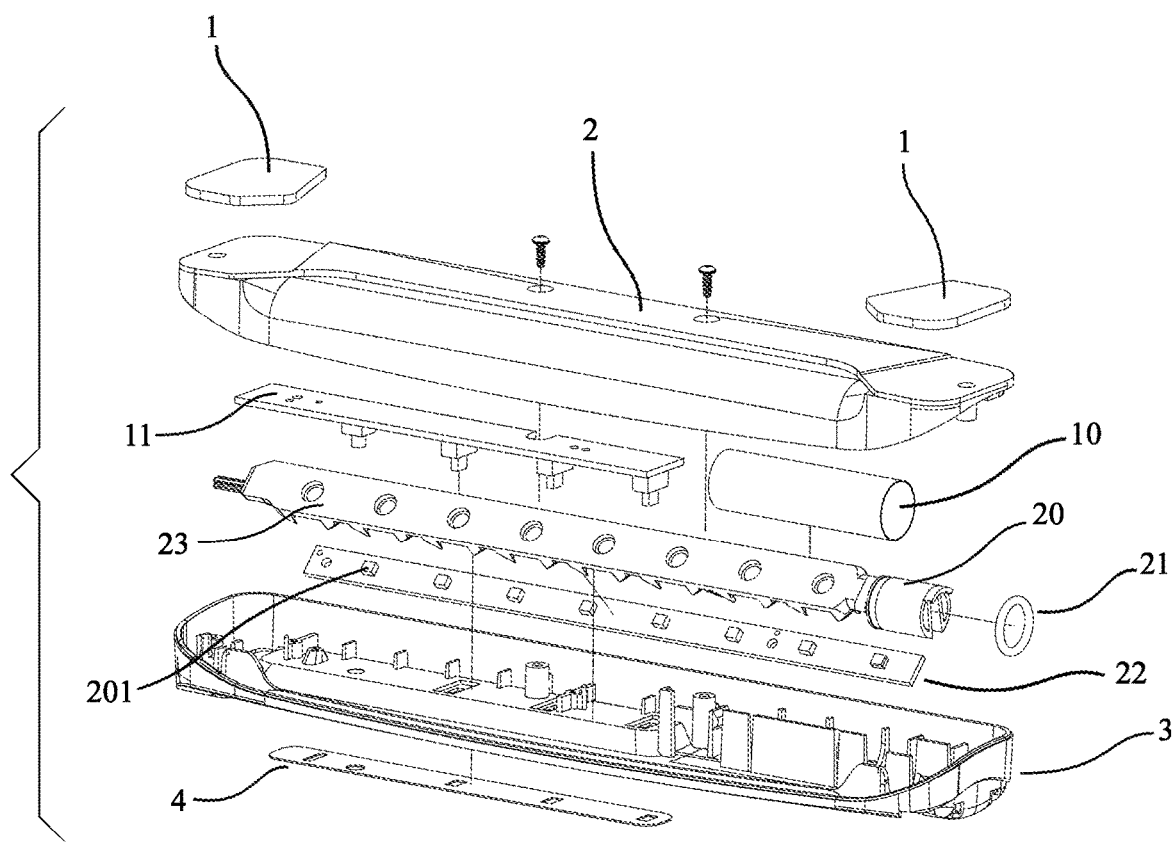
FIG. 2 is a wireframe, exploded view of the exemplary apparatus—and a brake lamp subassembly—shown in FIG. 1.

FIG. 2 is a wireframe, exploded view of the exemplary apparatus 42—and a brake lamp 37 subassembly—shown in FIG. 1. In the exemplary embodiment, carried by the housing 8 is a battery 10, Printed Circuit Board (PCB) containing processing circuitry 11, LED PCB 22 containing eight individual LEDs 201, lens 23, pivot 20, and rubber o-ring 21. Alternatively, such components can be fully contained within the housing 8 for additional protection. In this exemplary embodiment, the LED PCB 22 has eight high-flux, wide-angle LEDs 201, however, the number of LEDs 201 can be varied, depending on the desired light output and effective projected luminous lens area of the light output. A user interface label 4 shows a user how to operate the apparatus 42. The battery 10 is a type of power supply, and in this embodiment, it is a lithium battery 10. However, it will be appreciated that the power supply could be in an alternative form, such as a solar cell that harnesses energy from solar radiation 41, or as a battery 10 that is of a non-lithium chemistry, for example.

Figure 3:
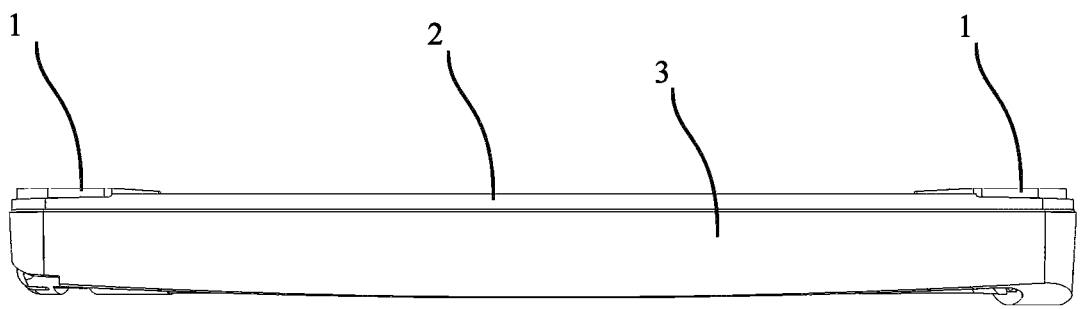
FIG. 3 is a top view of the exemplary embodiment.
Figure 4:
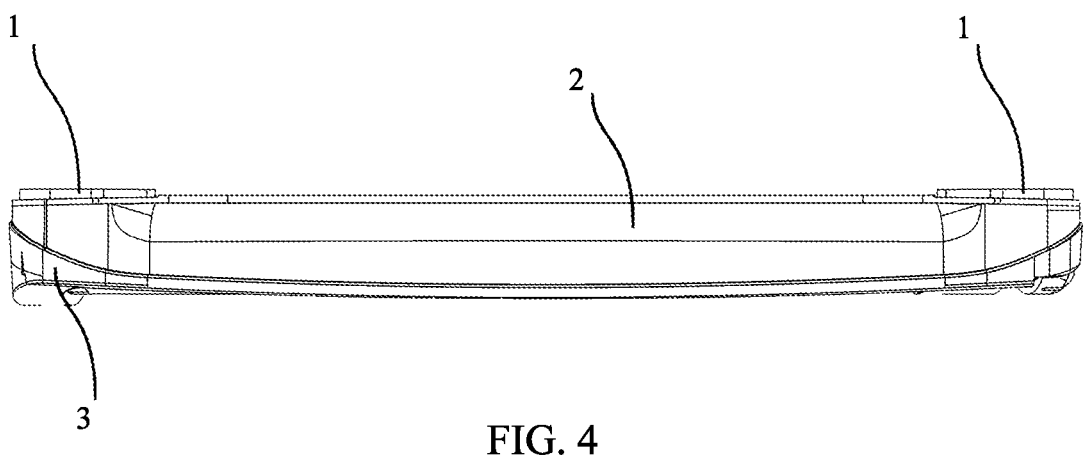
FIG. 4 is a bottom view of the exemplary embodiment.

FIGS. 3 and 4 are a top view and bottom view of the exemplary apparatus 42, respectively.

Figure 5:
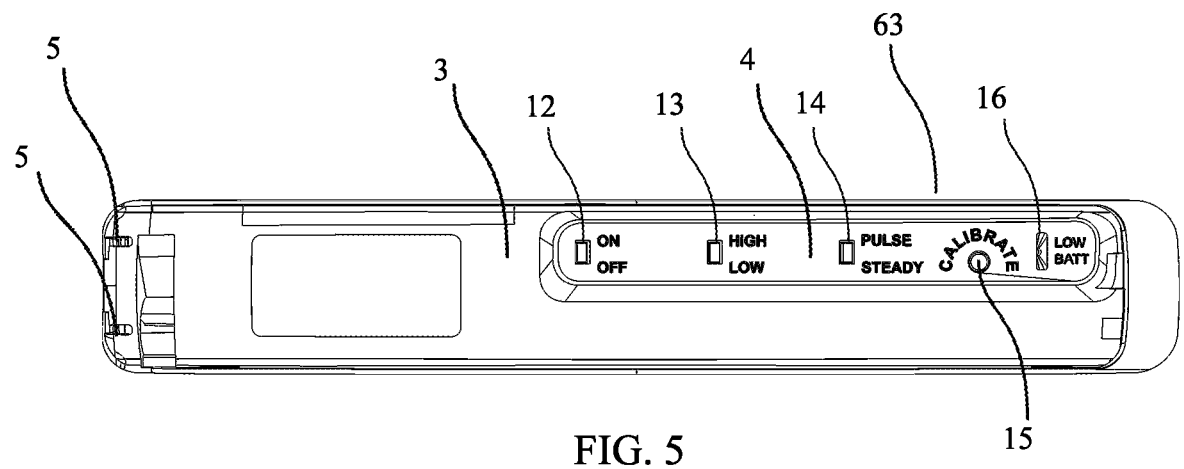
FIG. 5 is a front view of the exemplary embodiment.

FIG. 5 is a front view of the apparatus 42. A user interface 63 enables a user to operate the apparatus 42.

Figure 6:
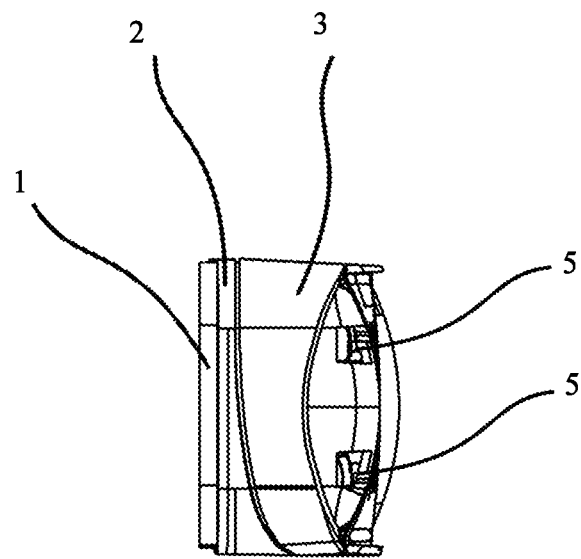
FIG. 6 is a left side view of the exemplary embodiment.
Figure 7:
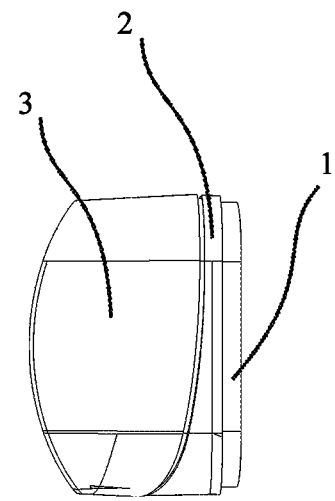
FIG. 7 is a right side view of the exemplary embodiment.
Figure 8:
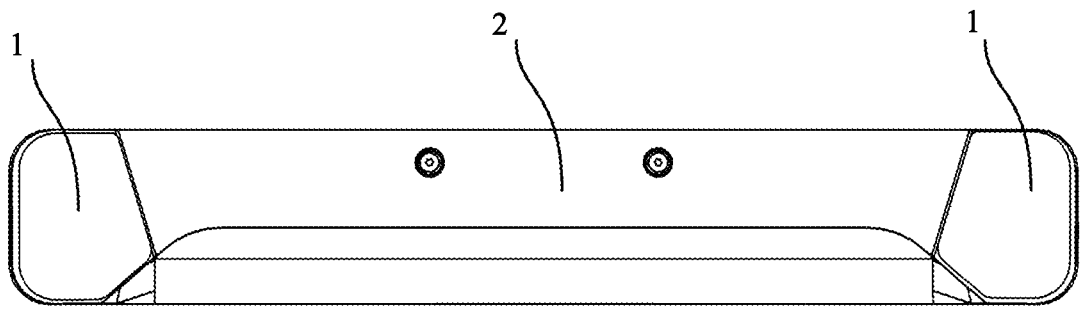
FIG. 8 is a back view of the exemplary embodiment.

FIGS. 6, 7, and 8 are a left view, right view, and back view of the apparatus 42, respectively.

Figure 9:
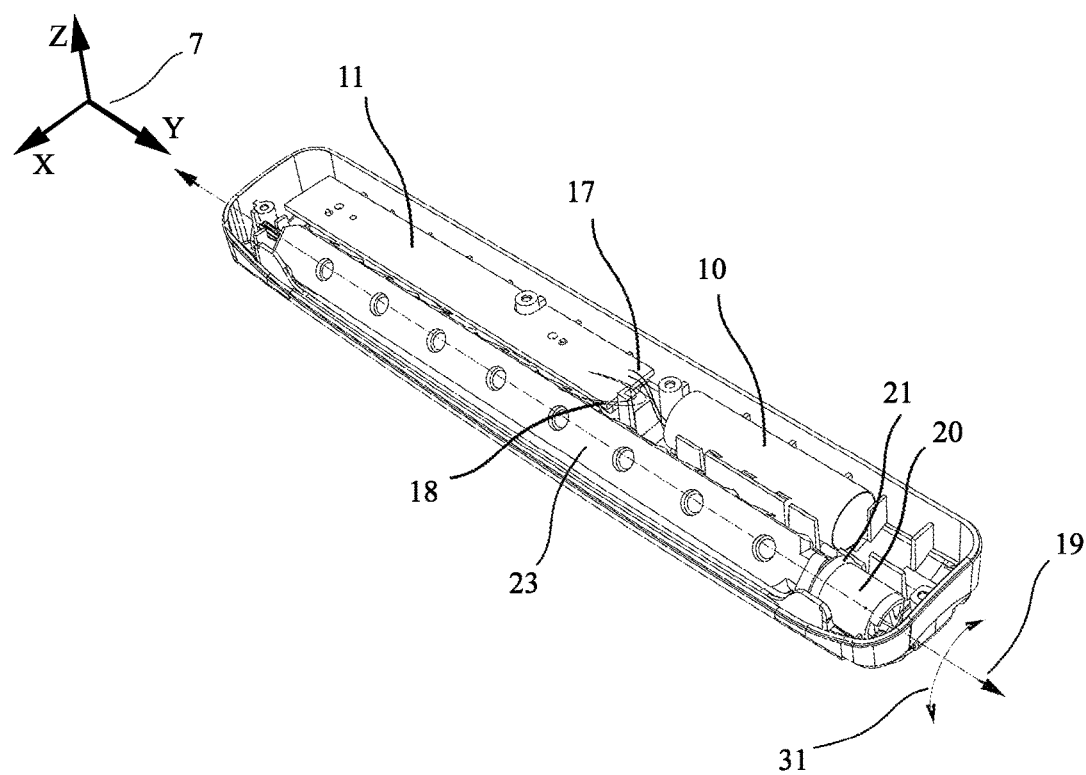
FIG. 9 is a wireframe, perspective view of the apparatus with the back housing and mount removed.

FIG. 9 is a wireframe, perspective view of the apparatus 42 with the back housing 2 and adhesive pads 1 removed. The battery 10 is coupled to the PCB containing processing circuitry 11 via a set of power wires 17. The PCB containing processing circuitry 11 is also connected to the LED PCB 22 by a set of wires for LED activation 18. The brake lamp 37 rotates 31 about an axis 19 that passes through the housing 8. The axis 19 is preferably normal to both the primary direction of travel 45 of the vehicle 44 and gravity 301. To be more specific, the direction of gravity is considered the direction of terrestrial gravity which is the direction of gravity resulting from Earth's gravitational pull. By rotating 31, the brake lamp 37 is able to adjust the direction of the light output 25 to to be directly opposite the vehicle's primary direction of travel 45, regardless of the angle 401 of the rear window 43. In so doing, the brake lamp 37 is capable of signaling to a following driver when activated because that following driver is in a following vehicle 404 facing the apparatus 42.

Since the brake lamp 37 is contained within the housing 8, it is protected from the environment as it rotates 31 about the axis 19. Since, for most vehicles, the rear window 43 was not specifically designed for aftermarket brake light installations, there is sometimes limited space for an installation. As a result, drivers, passengers, and pets can inadvertently come into contact with the apparatus 42. Such contact may be the result of a curious child reaching a hand towards the housing 8, a passenger's head bumping into the housing 8, or a passenger throwing a coat into the back of a vehicle which causes said coat to strike the apparatus 42, to name a few examples. By containing the brake lamp 37 within the housing 8, the apparatus 42 reduces the maintenance required for operation, as the adjustable brake lamp 37 is protected from accidental, undesirable modification.

An accelerometer 60 is at least one of the elements on the PCB containing processing circuitry 11, and it has an orientation 7. However, this orientation 7 can be arranged in any direction, as all three axes of the accelerometer 60 are able to measure acceleration in both positive and negative directions. Since the accelerometer 60, in this exemplary embodiment, is fixed in orientation relative to the housing 8 and, thus, the rear window 43 of the vehicle 44, there is no concern that the orientation of the accelerometer 60 could change as a result of being bumped by passengers, as it is held in place rigidly.

An acceleration sensor measures acceleration, and an accelerometer 60 is a type of acceleration sensor. Often, it is a three-axis MEMS type, but it could be of another type as well, based on two axes instead of three, or even a single-axis design. However, having at least two axes are preferable as they help determine deceleration of the vehicle 44. The acceleration sensor determines the acceleration of the vehicle 44 and communicates acceleration readings to the processor 61. Acceleration can be positive or negative. When it is negative, it is referred to as deceleration. In the case of a vehicle 44 traveling along a road surface 46, positive acceleration is along the primary direction of travel 45, and deceleration is the opposite direction which is a direction parallel to the light output 25 of the brake lamp 37. Deceleration can also be referred to as braking, or a slowing of the vehicle 44, which is often intentional and caused by application of a brake pedal of the vehicle 44.

The PCB containing processing circuitry 11 has control switches which are accessible to the user via openings in the front housing 3.

Figure 10:
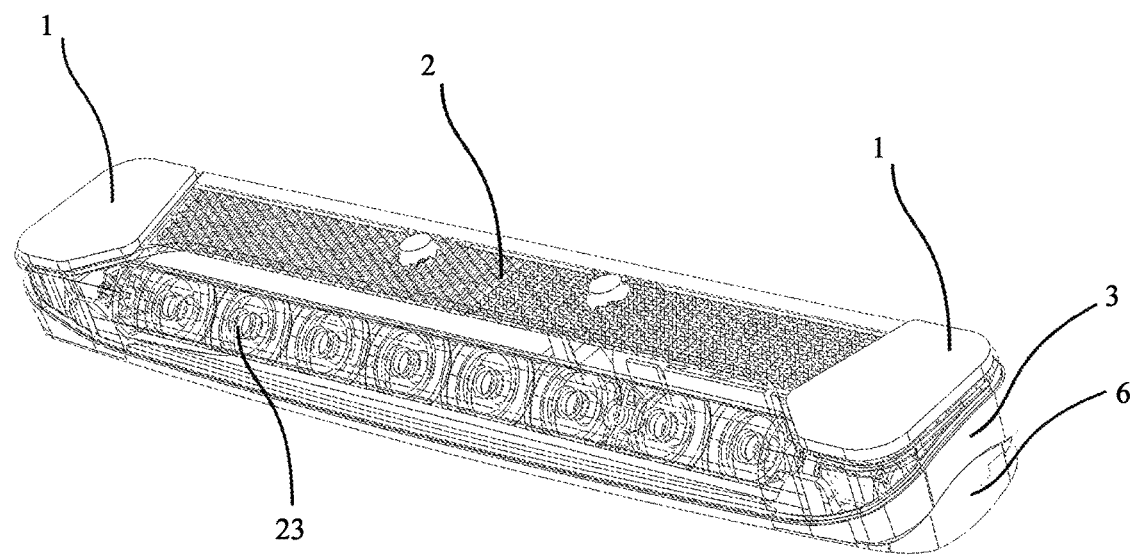
FIG. 10 is a perspective view of the apparatus where the back housing is transparent.

FIG. 10 is a perspective view of the apparatus 42, wherein the back housing 2 is transparent. The back housing 2 is transparent such that the light output from the lamp 37 passes through. In alternative embodiments, the back housing 2 can be entirely transparent, or only partially. Likewise, if the apparatus 42 is arranged differently, a portion of the housing 8 must enable the light output from the brake lamp 37 to pass through the housing 8 in the direction of light output 25. A front cover 6 is attached to the front housing 3 via clips 5 in the housing 8 so that the user interface 63 is protected.

Figure 11:
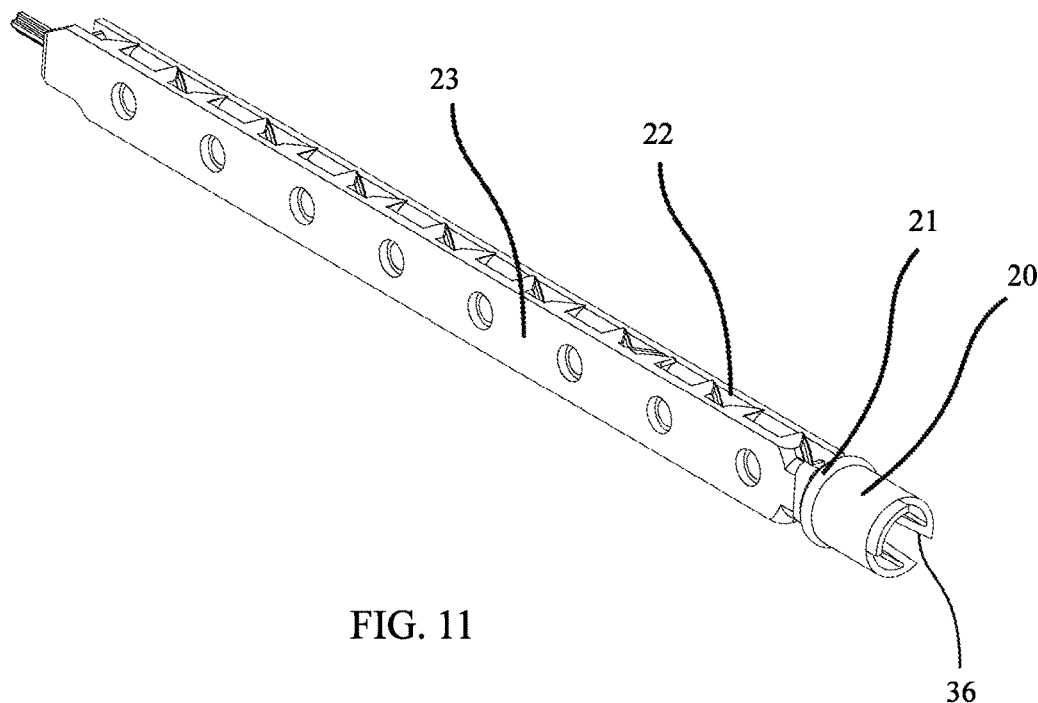
FIG. 11 is an exemplary brake lamp subassembly.

FIG. 11 is an exemplary brake lamp 37 subassembly. The brake lamp 37 is a subassembly of the apparatus 42, and it comprises a lens 23, LED PCB 22, pivot 20, and rubber o-ring 21. The pivot 20 is secured to the lens 23. A slot 36 is secured to the pivot 20. When illuminated, the brake lamp 37 signals the deceleration of the vehicle 44 to the driver of the following vehicle 404.

Figure 12:
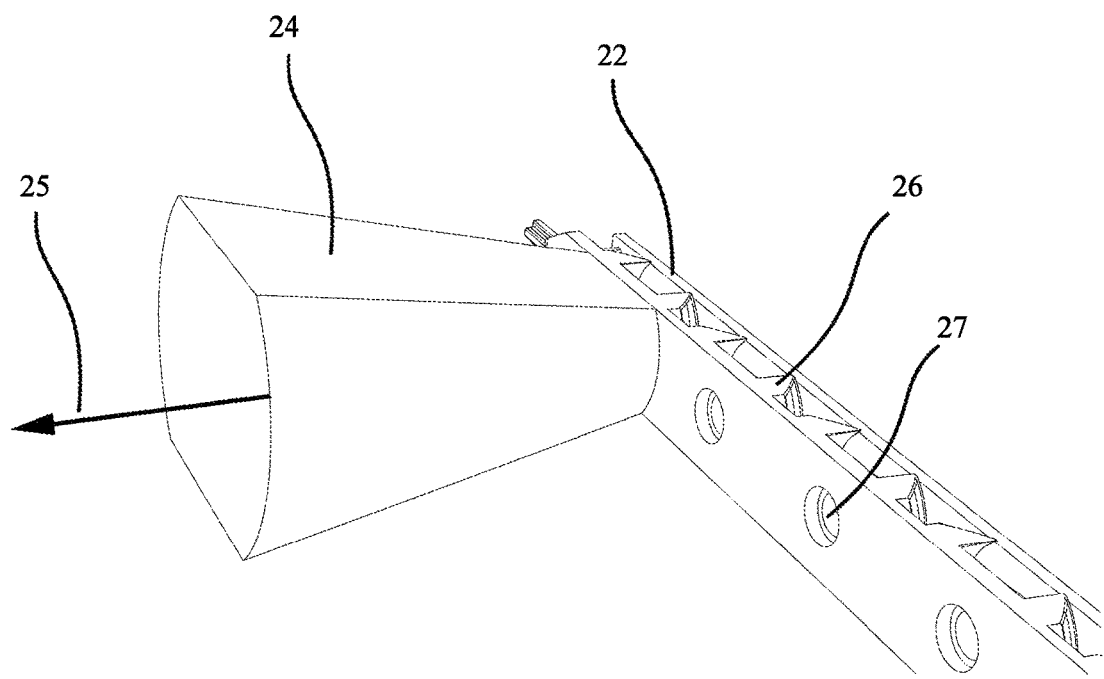
FIG. 12 is a close-up of one of the lenses in the exemplary brake lamp of FIG. 11 and also depicts a wireframe of the collimated light output from a sample, individual LED.

FIG. 12 is a close-up of one of the lenses of the brake lamp 37 of FIG. 11 and also depicts a wireframe 24 of the collimated light output from a sample, individual LED 201. Since the apparatus 42 emits light to the rear of the vehicle 44, the light output is preferably red in color to indicate deceleration, as is compliant with laws regarding automotive lighting. At the center of the wireframe 24 is the central direction of light output 25. The lens 23 collimates light emitted from the LEDs 201 via a fresnel lens 26 portion and a convex 27 portion. However, too much light collimation can make the signal of deceleration only visible within a narrow range behind the vehicle 44. As a result, it is best to collimate the light output of the LEDs 201 by only as much as is necessary to make the light output sufficiently visible and attention-getting to the driver of a following vehicle 404.

By utilizing a fresnel lens 26, the brake lamp 37 can be made smaller and lighter. This is advantageous, as it means less force will be required to hold the brake lamp 37 in its desired orientation, even while the vehicle 44 vibrates and jolts forcefully and erratically while in operation due to imperfections in the road surface 46. Also, by utilizing a collimating lens design, the brake lamp 37 outputs light with a larger effective projected luminous lens area. This increases the visibility of the light output.

Figure 13:
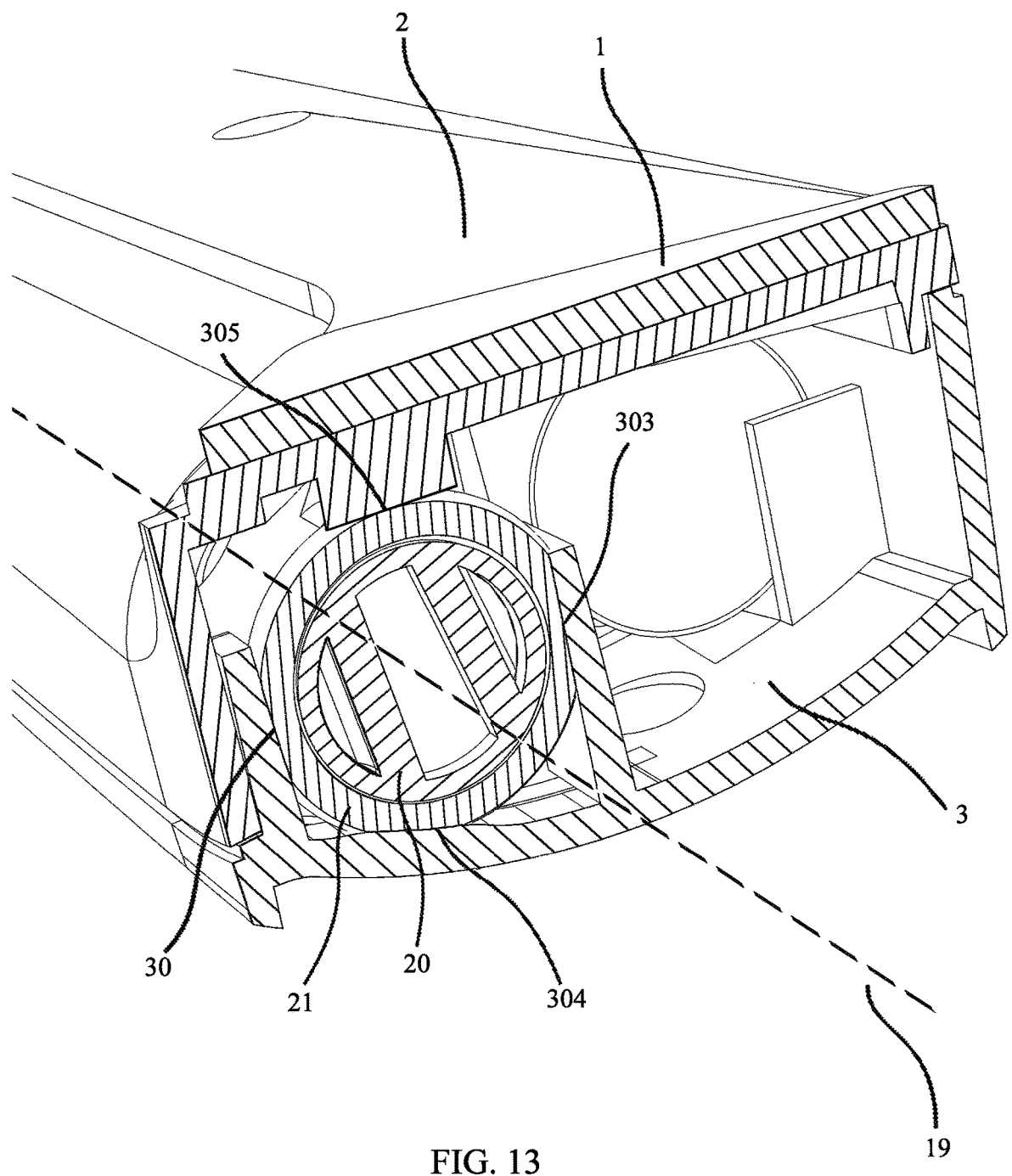
FIG. 13 is a wireframe, section view sectioned from FIG. 1, highlighting the pivoting function.

FIG. 13 is a wireframe, section view sectioned from FIG. 1, highlighting the pivoting function. The rubber o-ring 21 is compressed 30 against the housing 8. As the pivot 20 rotates about the axis 19 that passes through the housing 8, a frictional force 302 generated by the rubber o-ring 21 opposes the rotation 31. Once the pivot 20 is not rotating relative to the housing 8, the frictional force 302 increases due to static friction and further prevents the brake lamp 37 from rotating 31. This frictional force 302 is helpful in ensuring that the brake lamp 37 will stay in a fixed orientation once it has been set, despite any vibration of the vehicle 44, jolts due to imperfections on the road surface 46, or accidental impact with the apparatus 42 as a result of the behavior of the occupants of the vehicle 44.

The compression 30 of the rubber o-ring 21 increases the frictional force 302 that the housing 8 exerts on the brake lamp 37 to oppose the rotation 31. The rubber o-ring 21 is secured on the front 304, back, 305, and top 303 as well. As a result, the pivot 20 is able to rotate 31 within the housing 8. Alternatively, the pivot 20, instead of the o-ring 21, could be supported on one or more sides by the housing 8.

Figure 14:
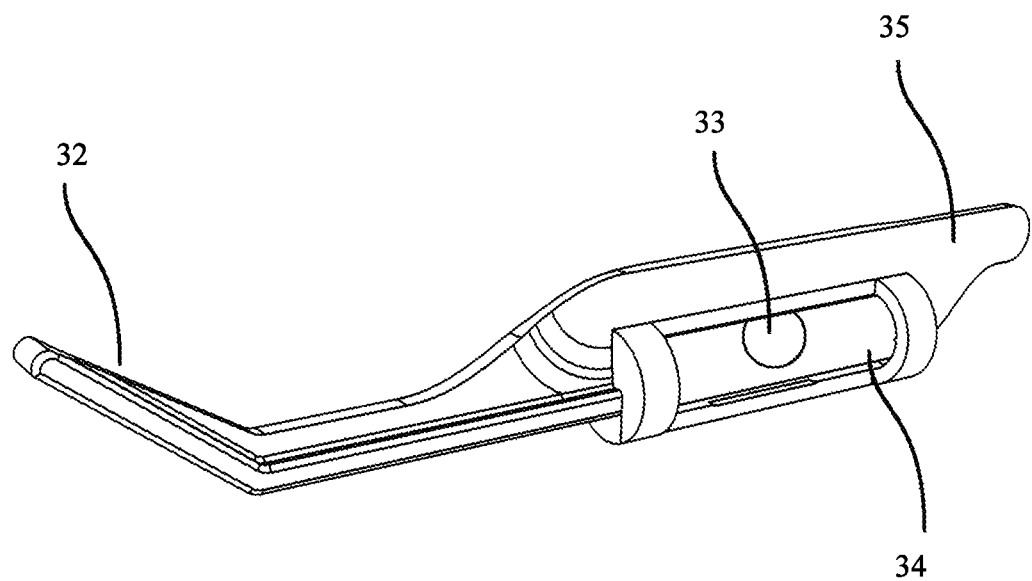
FIG. 14 is an exemplary leveling arm.

FIG. 14 is an exemplary leveling arm 38. The leveling arm 38 enables the user to adjust the orientation of the brake lamp 37 relative to the housing 8. This is important for simplified installation since the housing 8 secures to the rear window 43 in a set orientation relative to the rear window 43, but, depending on the angle 401 of the rear window 43, the brake lamp 37 may still need to be adjusted so that the direction of light output 25 is parallel to the road surface regardless of the angle 401 of the rear window 43. The leveling arm 38 has a nose 32 shaped such that it can be inserted into the slot 36 and engaged. This nose 32 can be more generally referred to as a pin. A spirit vial 34 contains liquid such that a bubble 33 is formed within the spirit vial 34. The spirit vial 34 and the contained bubble 33 constitute a spirit level. When the spirit level is horizontal relative to the earth's surface, the bubble 33 becomes centered within the spirit vial 34 as a result of gravity 301, indicating that the spirit vial 34 is horizontal.

Figure 15:
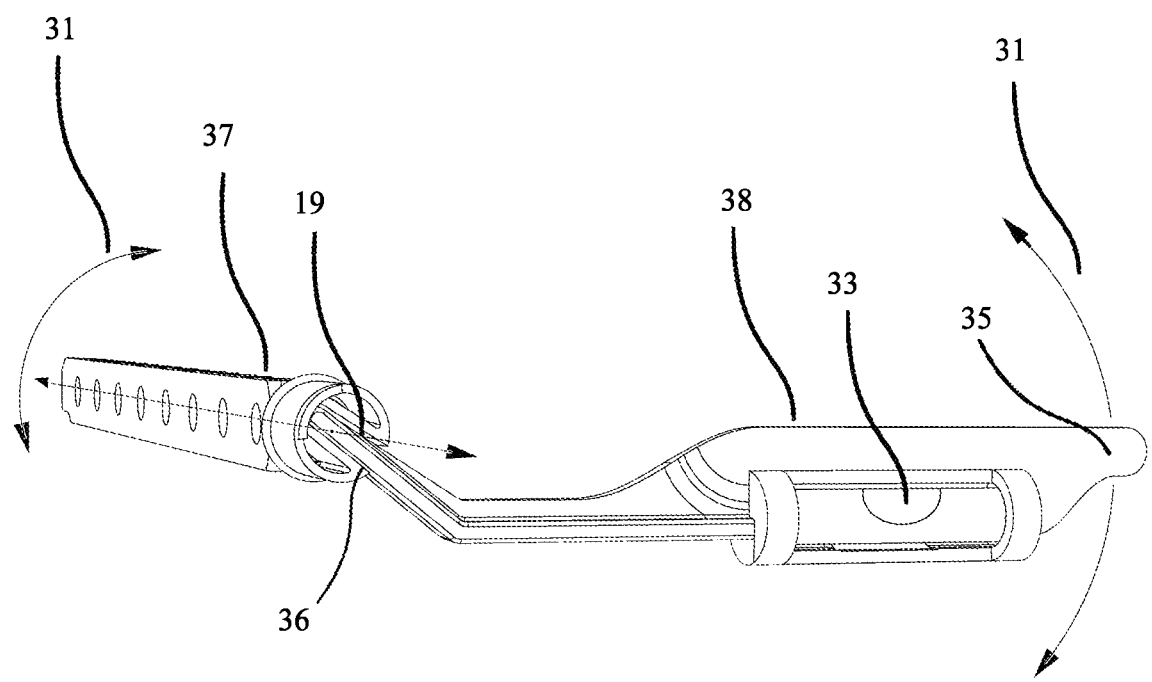
FIG. 15 is an isolated wireframe of the exemplary leveling arm engaged with the brake lamp.

FIG. 15 is an isolated wireframe of the exemplary leveling arm 38 engaged with the brake lamp 37. The user inserts the nose 32 of the leveling arm 38 into the slot 36 of the brake lamp 37. Once engaged, the leveling arm 38 is manipulated by the user-manipulated portion 35 such that the leveling arm 38 rotates 31 about the axis 19 that passes through the housing 8. As such, the brake lamp 37 and the leveling arm 38, rotate 31 in unison about the same axis 19. The nose 32 is oriented relative to the spirit vial 34 such that when the spirit vial 34 is horizontal, the direction of light output 25 is also horizontal. If the installation of the apparatus 42 is on a horizontal road surface 46, as is preferable, this process will ensure the direction of light output 25 is parallel to the road surface 46.

Once used, the leveling arm 38 is then disengaged and removed from the slot 36 secured to the brake lamp 37. Once disengaged from the leveling arm 38, the brake lamp 37 is held in place by the frictional lock shown in FIG. 16. The distance from the user manipulated portion 35 to the axis 19 is much larger than the distance from the axis 19 to the compression of the rubber o-ring 30. As a result, the leveling arm 38 creates for the user a larger moment arm about the axis 19 than does the frictional force 302 of the frictional lock. As a result, it is easy for the user to rotate 31 the brake lamp 37, but, once rotated 31, the brake lamp 37 is held in place securely. After installation, the leveling arm 38 is not needed for normal operation of the apparatus 42.

Figure 16:
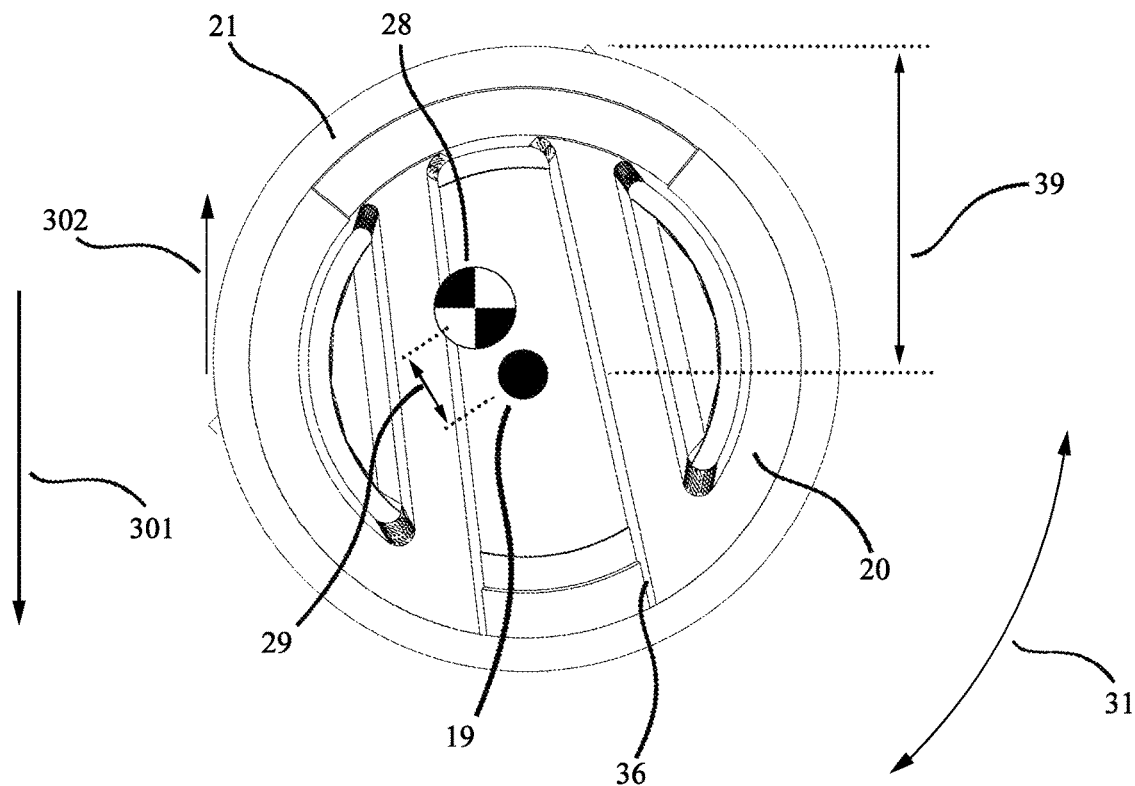
FIG. 16 is a side view of the exemplary brake lamp, highlighting a frictional lock.

FIG. 16 is a side view of the exemplary brake lamp 37, highlighting a frictional lock that holds the brake lamp 37 in a fixed orientation relative to the housing 8. The brake lamp 37 has a center of gravity 28 that is an offset distance 29 from the axis 19 that passes through the housing 8. The axis 19 that passes through the housing 8 is a distance 39 from the surface of the rubber o-ring 21. The rubber o-ring 21 is secured to the pivot 20, such that they rotate 31 about the axis 19 through the housing 8 at the same rate. The center of gravity 28 creates a torque about the axis 19 as a result of the acceleration due to gravity 301. This torque is opposed by the frictional force 302 generated by the compression 30 of the high-friction, rubber o-ring 21 against the housing 8.

As the vehicle 44 travels along the road surface 46, imperfections in such road surface will cause a sudden acceleration of the vehicle 44, thereby increasing the torque caused by the center of gravity 28 about the axis 19. In order to hold the brake lamp 37 in its desired orientation, such an increase in acceleration must be matched by the frictional force 302 generated by the rubber o-ring 21. The greater the offset distance 29, the greater the moment arm about the axis 19 and the greater the resulting torque. By minimizing the offset distance 29, the brake lamp 37 will experience less of a torque about the axis 19 that passes through the housing 8, and the surface of the rubber o-ring 21 will not have to generate as large of a frictional force 302. This makes it easier to maintain the brake lamp 37 in a fixed orientation such that the light output direction 25 remains substantially to the rear of the vehicle 44, opposite the primary direction of travel 45. By opposing rotation 31 of the brake lamp 37 that would otherwise be caused by vibration and normal driving movements, the apparatus 42 is able to operate longer with substantially less maintenance or adjustment required.

Figure 17:
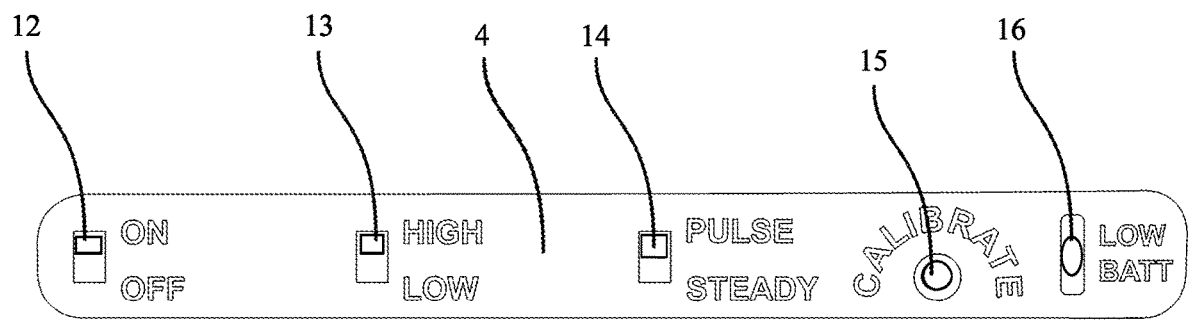
FIG. 17 is an exemplary user-interface.

FIG. 17 is the exemplary user interface 63. An ON-OFF slide switch 12 turns the apparatus 42 on or off. The apparatus 42 is designed so that it can be left on for an extended period of time, preferably at least four years. A HIGH-LOW slide switch 13 controls the brightness of the lights when they are illuminated. Such functionality gives a user flexibility as local laws can vary, causing multiple brightness options to be needed in order for the apparatus 42 to be legally compliant in the various jurisdictions in which the vehicle 44 could drive. Additionally, the translucence of the rear window 43 varies depending on the vehicle 44. Having the ability to select an output light brightness enables the user to achieve the desired brightness even if their vehicle has a non-standard window tint. For example, such window could be tinted prior to, or sometime after, installation of the apparatus 42. Since the apparatus 42 can be adjusted for different window settings, the user does not need to accommodate the apparatus 42 when selecting a desired translucency of their rear window 43—the apparatus 42 can adjust accordingly. Additionally, since this flexibility makes the apparatus 42 easier for the user to install, maintenance is reduced. Finally, the adjustable brightness maximizes the effectiveness of the signal as it occurs at maximum brightness for maximum visibility to the driver of the following vehicle 404.

A PULSE-STEADY slide switch 14 enables the user to select a customized sequence of illumination for the LEDs 201 within the LED PCB 22. In this embodiment, the PULSE-STEADY slide switch 14 can be set to enable pulsing mode, in which the LEDs 201 flash at a frequency of 5 hz. This is a frequency of activation that is proven to signal rapid deceleration more quickly, but any illumination design may be used instead. The STEADY option causes the LEDs 201 to illuminate steadily instead. Since local laws vary, the apparatus 42 has steady mode primarily to provide a setting for users that is legal in a wider variety of jurisdictions. By presenting options of both STEADY and PULSE, the apparatus 42 is more versatile.

Figure 18:
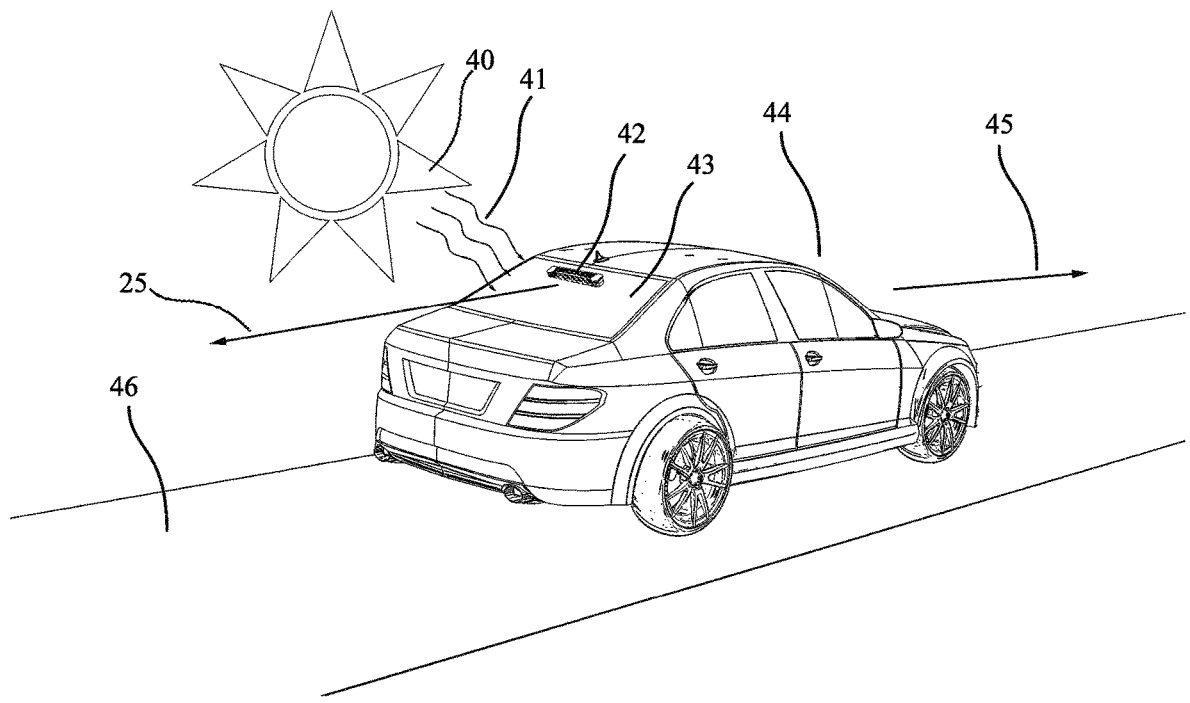
FIG. 18 is an exemplary environment in which the apparatus functions.

A CALIBRATE tactile switch 15 defines the end of the programming and installation, causing the circuitry of the PCB containing processing circuitry 11 to start programming operation. By requiring this button to be pressed and held for a minimum amount of time, say four seconds, the likelihood that the programming operation is inadvertently reset decreases. A low battery indicator 16 is a blinking LED that alerts users when the battery 10 will shortly be depleted. The low battery indicator 16 LED blinks when the CALIBRATE tactile switch 15 is pressed and the battery 10 is running low. Since the CALIBRATE tactile switch 15 is near the low battery indicator 16, the user will likely already be looking at the apparatus 42 to see the low battery indicator 16 LED when it blinks FIG. 18 is an exemplary environment in which the apparatus 42 functions. A vehicle 44 drives along a road surface 46 in a primary direction of travel 45. There are many types of road surfaces. For example, the road surface 46 could be composed of asphalt, dirt, stone, or concrete, etc., and maintained by a public municipality, maintained privately, or unmaintained, etc. The vehicle has a rear window 43. The apparatus 42 is mounted to the interior 48 of said rear window 43. The interior 48 of the rear window 43 is defined as the side of the rear window 43 that is farther along the primary direction of travel 45. The brake lamp 37 of the apparatus 42 is angled such that the primary direction of light output 25 is opposite the primary direction of travel 45 of the vehicle 44. The sun 40 emits solar radiation 41 towards the rear window 43. Since the apparatus 42 is installed to the interior 48 of the rear window 43, at least some of the solar radiation 41 is absorbed by the apparatus 42.

Figure 19:
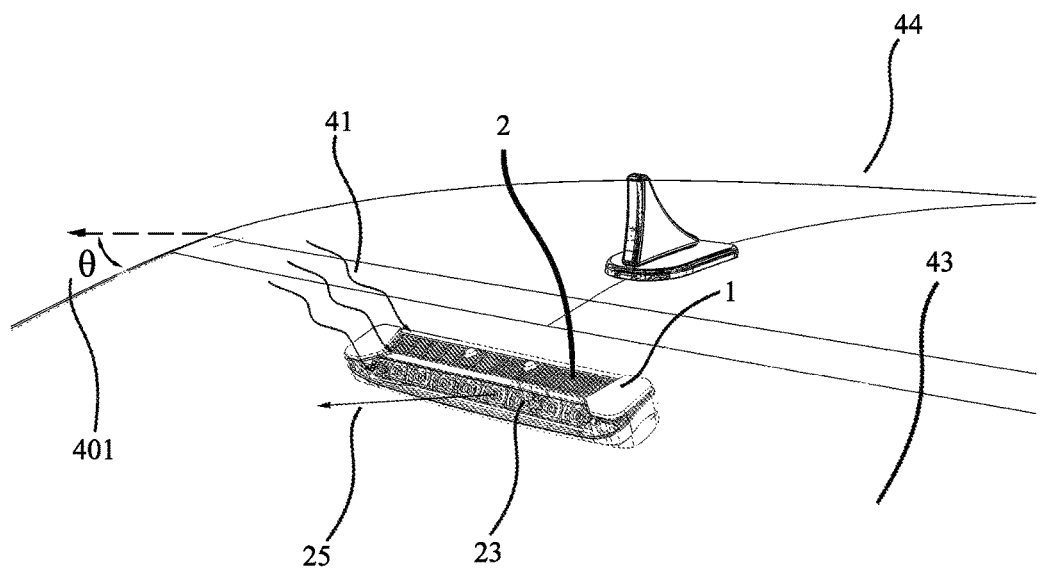
FIG. 19 is a close-up of the exemplary embodiment on the exemplary vehicle of FIG. 18.

FIG. 19 is a closeup of FIG. 18. The solar radiation 41 is at least partially absorbed by the apparatus 42, especially the back housing 2 as it directly faces the sun 40, depending on the orientation of the sun 40 in the sky. When the vehicle 44 is in such position that the solar radiation 41 from the sun 40 is able to pass unobstructedly to the vehicle 44, as it is depicted in FIG. 19, the vehicle 44 is said to be in direct sunlight.

Figure 20:
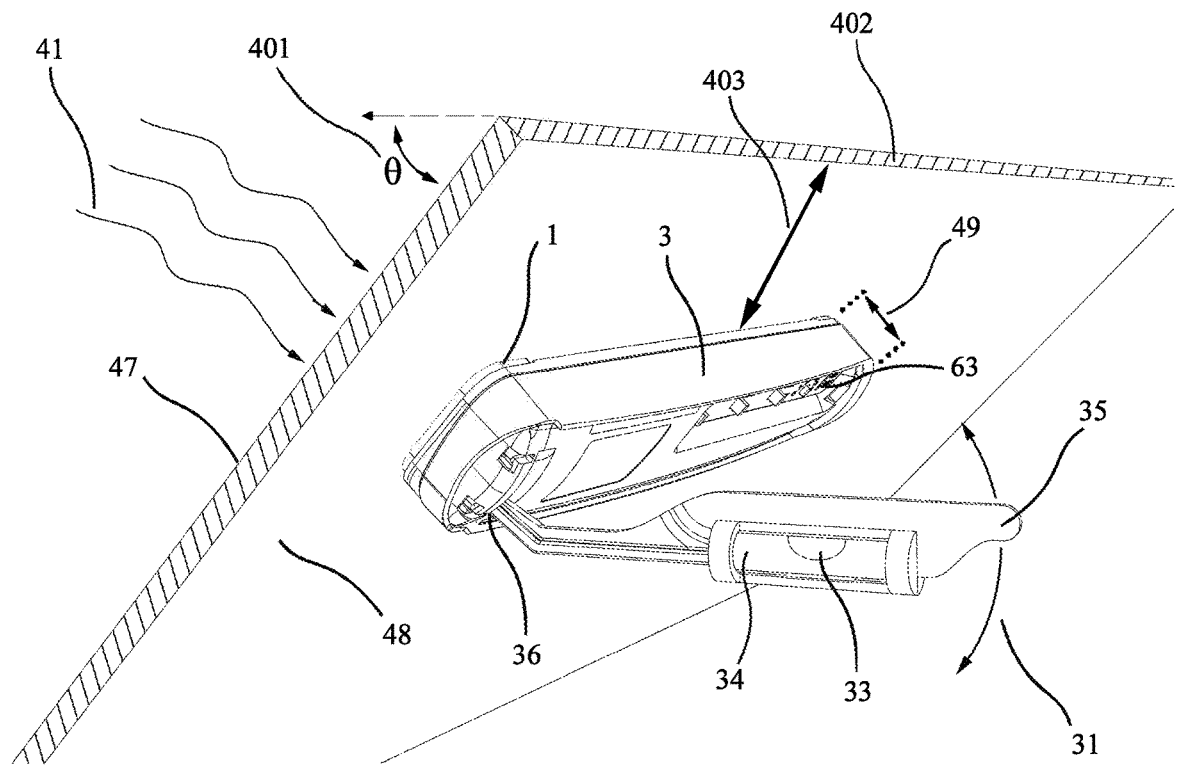
FIG. 20 depicts the apparatus during installation.

FIG. 20 depicts the apparatus 42 during installation. The apparatus 42 is secured to the interior 48 of the rear window 43 via two adhesive pads 1. Solar radiation 41 passes through the exterior 47 of the rear window 43 and is at least partially absorbed by the apparatus 42. The user interface 63 enables the user to adjust the settings of the apparatus 42 during installation. Once secured to the interior 48 of the rear window 43 and set via the user interface 63, the leveling arm 38 is inserted into the slot 36 of the brake lamp 37. The leveling arm 38 is then rotated 31 until the bubble 33 within the spirit vial 34 indicates that the spirit vial 34 is horizontal. This, in turn, indicates that the light output 25 from the brake lamp 37 is opposite the primary direction of travel 45 of the vehicle 44.

By minimizing the depth 49 of the apparatus 42, the apparatus 42 becomes less intrusive within the vehicle 44. As such, it is less vulnerable to getting bumped, to damaging the vehicle if the rear window 43 were to move, and to causing injury to a passenger due to unintentional contact. Additionally, by minimizing the distance 403 between the apparatus 42 and the top 402 of the rear window 43, the driver of the vehicle 44 will have less visual impairment when looking through the rear window 43. This eases operation of the apparatus 42, as it is hardly noticeable to the driver of the vehicle 44 during normal driving and operation.

Automotive-grade batteries are a standard for the trying environment inside a vehicle 44. Since the apparatus 42 may be exposed to a significant quantity of solar radiation 41, depending on the time of day, location, and vehicle 44, the apparatus 42 must be able to withstand high temperatures. The battery 10 is the biggest risk—failure can cause expulsion of highly toxic chemicals, flame, or explosion. A standard, automotive-grade, lithium metal battery is able to operate in environments up to 85 degrees Celsius. Such battery is often of either type: lithium manganese dioxide or lithium thionyl chloride. Since a vehicle 44 has a greenhouse effect when it is left in direct sunlight, the interior air of the vehicle 44 becomes much hotter than the outside air. As such, when the apparatus 42 is mounted to the outside of the vehicle 44—a battery 10 equipped to operate in temperatures up to 85 degrees Celsius is more than sufficient.

When considering safety, choosing an appropriate battery 10 for a given application is primarily a function of the maximum temperature of the operating environment combined with other stresses on the battery 10 such as vibration, impact, and maximum current draw. Safe operation of the battery 10 means that the battery 10 will not be expected to explode, vent, flame, or leak within its anticipated environment of operation. Since an increase in temperature of the battery 10 results in an increase in pressure within the battery 10, a battery 10 with a higher operating temperature must be selected when the battery will exhibit additional mechanical and electrical stress. For automotive products, when taking into account vibration, current draw, and impact, a battery capable of operation in environments up to 85 degrees Celsius is sufficient, as these stressors are considered standard and already taken into account in the maximum operating temperature. However, this is not true for the disclosed invention.

The battery 10 has the potential to approach 85 degrees Celsius when left in an unattended vehicle 44 in hot climates like the Southwest of the United States. Furthermore, a vehicle 44 parked in direct sunlight such that when passengers reenter the vehicle 44, they are still potentially in close proximity of a battery 10 that has been exposed to high temperatures. This could result in danger for the passengers and driver. However, the battery 10 is not exposed to these high temperatures for an extended period of time—solar radiation 41 absorption is typically highest during the four-hour period between 11 am and 3 pm. As such, outside of this time, and while the vehicle 44 is in operation, the temperature of the apparatus 42 will drop rapidly such that a standard automotive-grade battery 10 will suffice.

Normally, aftermarket automotive products require an automotive battery. Examples of such products include portable GPS units, toll transponders, and dashboard cameras. For automotive products such as these, a standard automotive battery that handles temperatures up to 85 degrees Celsius is sufficient. Furthermore, the user is often advised to simply remove the product from the vehicle 44 when the temperature is high for added safety. This is easier for a product like a GPS, since the product is placed in front of the driver and manipulated during operation, making it easier for the driver to remember to remove the product every time the driver leaves the vehicle 44.

However, the design of the apparatus 42 is such that it has specific safety challenges which is of particular concern since the purpose of the invention is to increase safety. These specific challenges are in addition to the normal automotive stressors such as road imperfections, high temperatures, and extensive vibration.

The disclosed invention has several unique stressors. During normal operation, the battery 10 must be able to power the LEDs 201, which require an abnormally high output of current, approximately 520 mA. This is a relatively high output current that raises the internal temperature of the battery 10 significantly.

In its best mode, the apparatus 42 has a transparent portion of the housing 8 that permits light to pass through. Since the housing 8 forms an enclosure, the apparatus 42 generates its own, additional greenhouse effect that further elevates its maximum temperature. Also, the apparatus 42 secures to a location on the rear window 43 that is close the backs of the heads of particularly vulnerable passengers, often children sitting in the rear seats of the vehicle 44. As a result, there is not only an increased safety risk, but the apparatus 42 is not readily visible to the passengers, so it is easy for them to accidentally impact the apparatus 42 unintentionally. This is especially dangerous since the point of contact for such accidental impact is often the back of a rear occupant's head. Since a battery 10 has the potential to expel highly toxic chemicals, flame, and even explode, this is extremely important to consider.

Impact from contact with a passenger can damage the battery 10 past its safety limit when at already high temperatures. Such is especially the case when a passenger enters the vehicle 44 after it has been parked in direct sunlight during the four-hour period from 11 am to 3 pm and experienced maximum thermal absorption and resulting temperature rise. Since passengers are most likely to inadvertently contact the apparatus 42 while they are entering or leaving the vehicle 44, this scenario carries significant risk. Due to the additional greenhouse effect and safety risk posed by the preferred installation location, the apparatus 42 faces stressors that surpass those of an automotive-grade battery.

The design elements of the invention generate three primary problems in the battery 10: 1) an unusually high output current causes an internal temperature rise, 2) an additional greenhouse effect, caused by the transparent portion of the housing 8, raises the temperature of the battery 10 further, and 3) the preferred location of the apparatus 42 is such that vulnerable passengers are at substantial risk if the battery 10 is not able to operate safely.

For these problems specific to this invention, there are two primary solutions. The first is to remove the battery 10 or entire apparatus 42, including the battery 10, from the vehicle 44 each time the vehicle 44 is parked in direct sunlight. This prevents the battery 10 from exceeding 85 degrees Celsius so that an automotive-grade battery can be used. However, for this invention, the apparatus 42 is designed to be as subtle as possible to the driver of the vehicle 44. As a result, it will be difficult for the driver to remember to remove the apparatus 42 from the vehicle 44 every time the vehicle 44 is parked in direct sunlight. This is especially true since the apparatus 42 is designed such that the driver need not interact with it or think about it, after installation. As failure to remove the apparatus 42 can cause catastrophic failure resulting in serious injury, death, or property damage, this solution has serious limitations.

The second solution is to utilize a battery 10 designed to different standards, such as those from the industries of military, drilling, or aerospace. In these industries, battery design is centered around ruggedization. This ruggedization is ideal to accommodate the high temperature resistance and corresponding impact resistance that the battery 10 needs, since the temperature and pressure of the battery 10 are correlated. It is preferable that the invention utilize a battery 10 that can operate safely in environments of at least 90 degrees Celsius for a duration of at least four hours. Such characteristics enable a greater convenience, as the apparatus 42 can be mounted near passengers without the associated risk of impact from passengers. Also, with these characteristics, the apparatus 42 need not be removed from the vehicle 44 regardless of the environment. Operating above 100 degrees Celsius would further provide a margin of safety to consider the stress the battery 10 may experience if abused through normal operation and if never removed from the vehicle 44 after installation. While one would expect to use an automotive battery for this automotive invention, far greater operational potential can be realized by using a battery 10 that is most often associated with other, more demanding industries.

Figure 21:
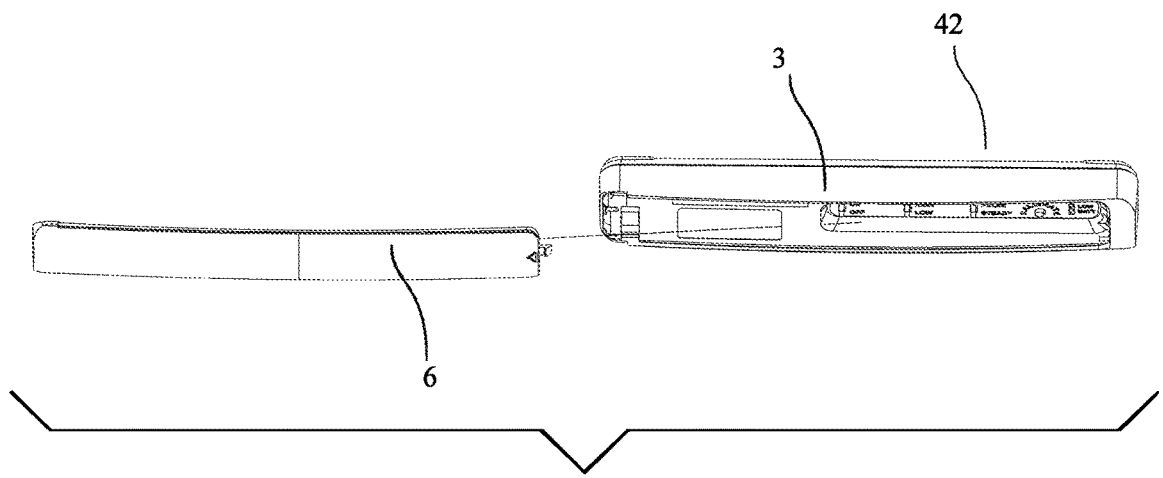
FIG. 21 is a wireframe, exploded view of a front cover and the rest of the apparatus.

FIG. 21 is a wireframe, exploded view of a front cover 6 and the rest of the apparatus 42. A front cover 6 can be installed to the front housing 3 such that, when combined, the user interface 63 is protected. Such protection reduces the maintenance required by the apparatus 42, because the front cover 6 prevents the user interface 63 and brake lamp 37 from being adjusted inadvertently by the user, passengers, pets, etc.

Figure 22:
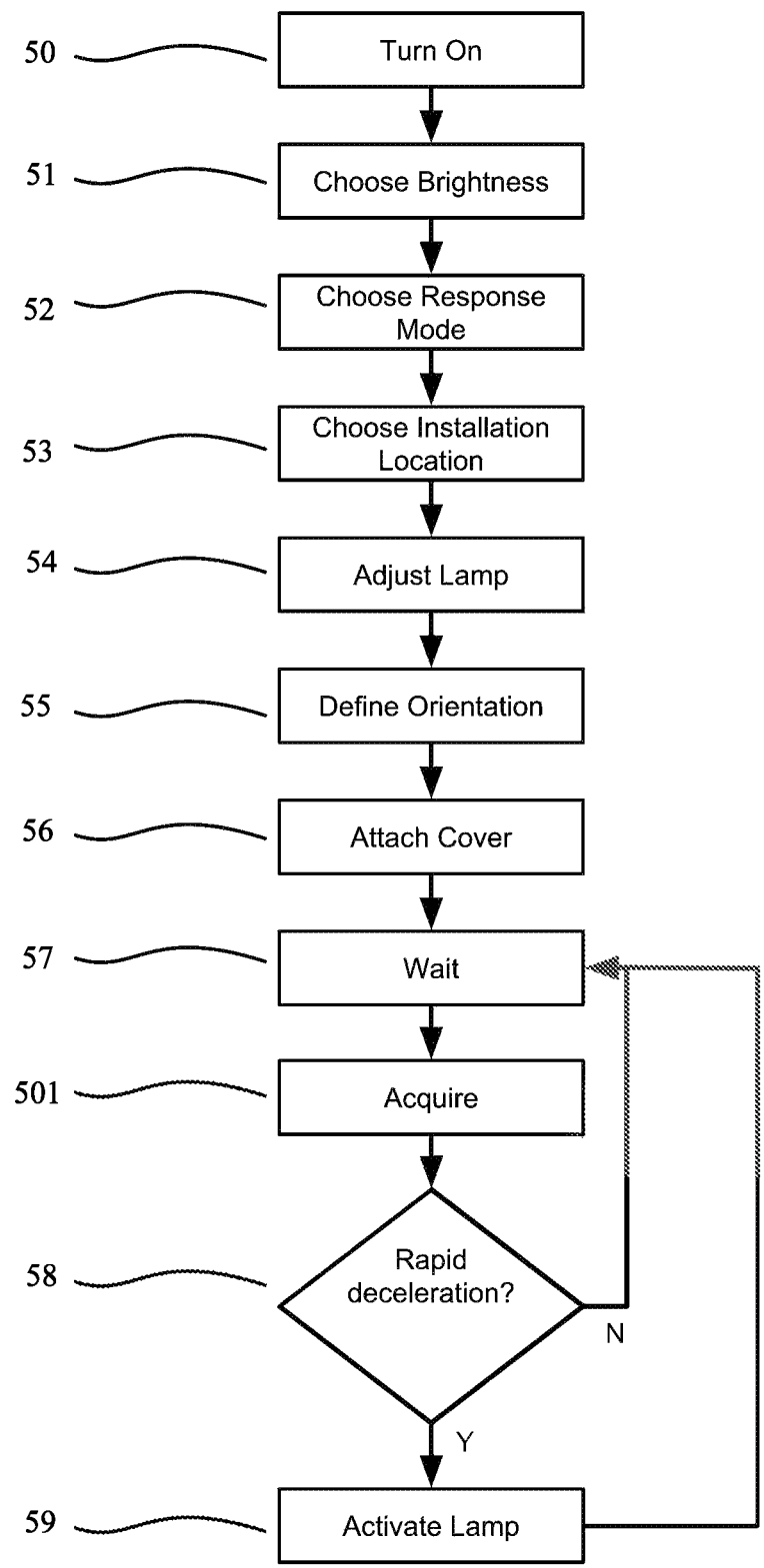
FIG. 22 is a flowchart outlining exemplary processes involved in operation of the apparatus

FIG. 22 is a flowchart outlining exemplary processes involved in operation of the apparatus 42. The user turns on 50 the electrical circuitry via the ON-OFF slide switch 12. A brightness is selected 51 via the HIGH-LOW slide switch 13. A response mode is selected 52 via the PULSE-STEADY slide switch 14. The user then chooses an installation location 53. This involves selecting a location on the vehicle 44 to which the apparatus 42 is secured via the adhesive pads 1; the top of the interior 48 of the rear window 43 is the preferable installation location.

The settings are available to the processor 61, and the processor 61 uses these settings to determine the pattern of light output. Once the apparatus 42 is secured to the rear window 43, the brake lamp 37 is adjusted 54 via rotation 31 of the leveling arm 38 so that the direction of light output 25 is opposite the vehicle's primary direction of motion 45. The orientation of the accelerometer 60 is then defined 55. Since the apparatus 42 signals deceleration along the primary direction of travel 45 of the vehicle 44, the accelerometer 60 must have its orientation defined relative to the primary direction of travel 45 in order to measure deceleration accurately.

The front cover 6 is then attached 56, protecting the user interface 63 from inadvertent manipulation. The processor 61 waits 57 for signals from the accelerometer 60. Once the accelerometer 60 is ready, the processor 61 acquires 501 the acceleration data gathered and transmitted by the accelerometer 60.

The processor 61 stores one or more thresholds of deceleration. The thresholds may be a value such that the vehicle 44 will be considered rapidly braking when the threshold has been exceeded. In such case, the apparatus 42 may wish to signal the rapid deceleration—or rapid braking as it is commonly referred when the rapid deceleration is intentional—to the driver of a following vehicle 404. Alternatively, the thresholds could be used to determine any deceleration, such as in the case where the apparatus 42 could serve as a standard, center high mounted stop lamp for older vehicles that do not have one.

Once the signals have been acquired by the processor 61, it then processes these signals and checks them against the one or more thresholds to see if the vehicle 44 is rapidly decelerating 58. If the vehicle 44 is not rapidly decelerating, the processor 61 goes back to waiting 57 for new signals from the accelerometer 60. If the vehicle 44 is rapidly decelerating, then the brake lamp 37 is activated 59. The type of such activation is based upon the settings selected by the user via the HIGH-LOW slide switch 13 and PULSE-STEADY slide switch 14. However, the settings can instead be pre-programmed by the factory as well. All types of activation involve illuminating the LEDs 201 within the brake lamp 37 to some degree.

Figure 23:
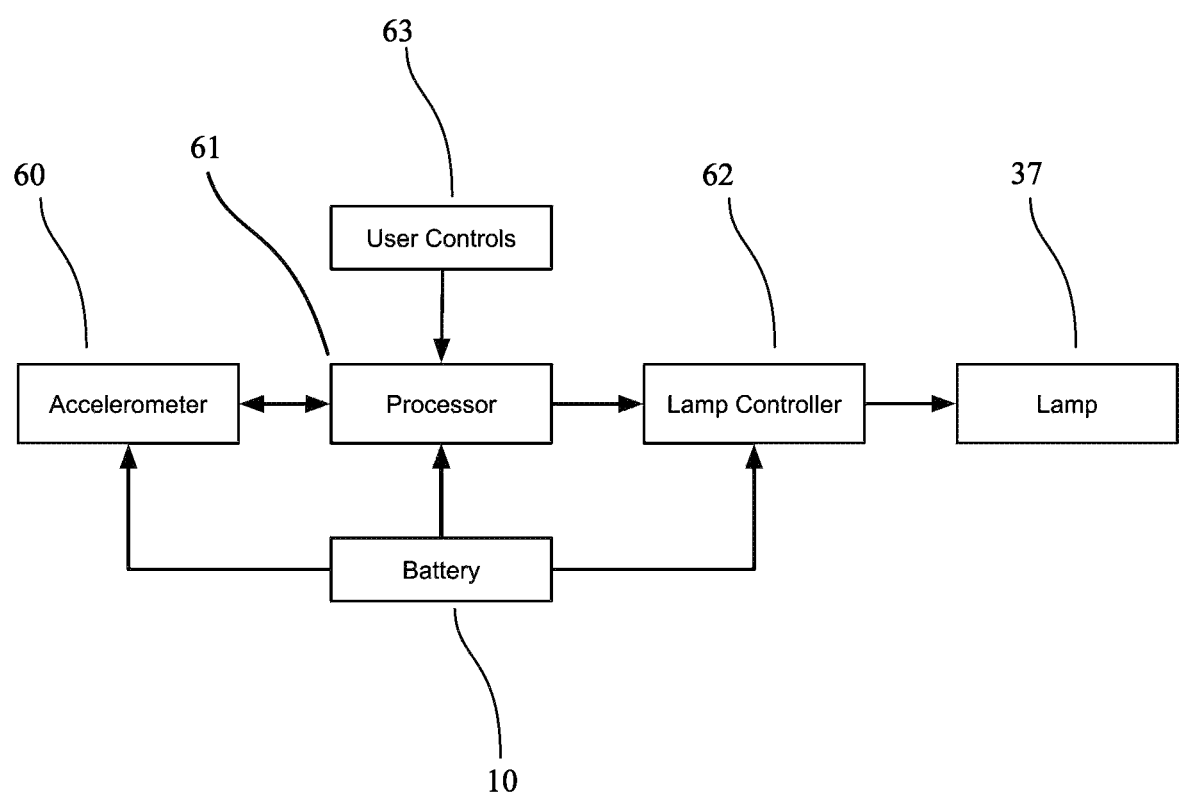
FIG. 23 is a block diagram of the electronic system.

FIG. 23 is a block diagram of the electronic system. The user control interface 63 is manipulated by the user and accordingly provides settings to the processor 61. The processor 61 adjusts an accelerometer 60 so that signals can be sent by the accelerometer 60 and interpreted by the processor 61. The accelerometer 60 measures the acceleration of the apparatus 42. Since the apparatus 42 is secured to a vehicle 44, the accelerometer 60 is therefore also measuring the acceleration of the vehicle 44.

The accelerometer 60 gathers and sends acceleration data to the processor 61. The processor 61 interprets the acceleration data to determine if the vehicle 44 is decelerating rapidly 58. If the vehicle 44 is decelerating rapidly, then the processor 61 instructs a lamp controller 62 to provide power to the brake lamp 37 via the set of wires for LED activation 18. The lamp controller 62 is such that the processor 61 is able to instruct it to power the brake lamp 37 with a variety of brightnesses and patterns of illumination. Such instructions may be in the form of Pulse Width Modulation (PWM) signals that enable the processor 61 to precisely control the brightness of the illumination of the brake lamp 37.

The battery 10 provides power to the accelerometer 60, processor 61, and lamp controller 62. In turn, the lamp controller 62 delivers power from the battery 10 to the brake lamp 37, when instructed to do so by the processor 61.

In an exemplary embodiment, the lamp controller 62 is a MOSFET transistor, however, it could be another type of transistor or LED driver as well, for example. Also, the processor 61 is a low power, programmable, 8-bit microcontroller.

Figure 24:
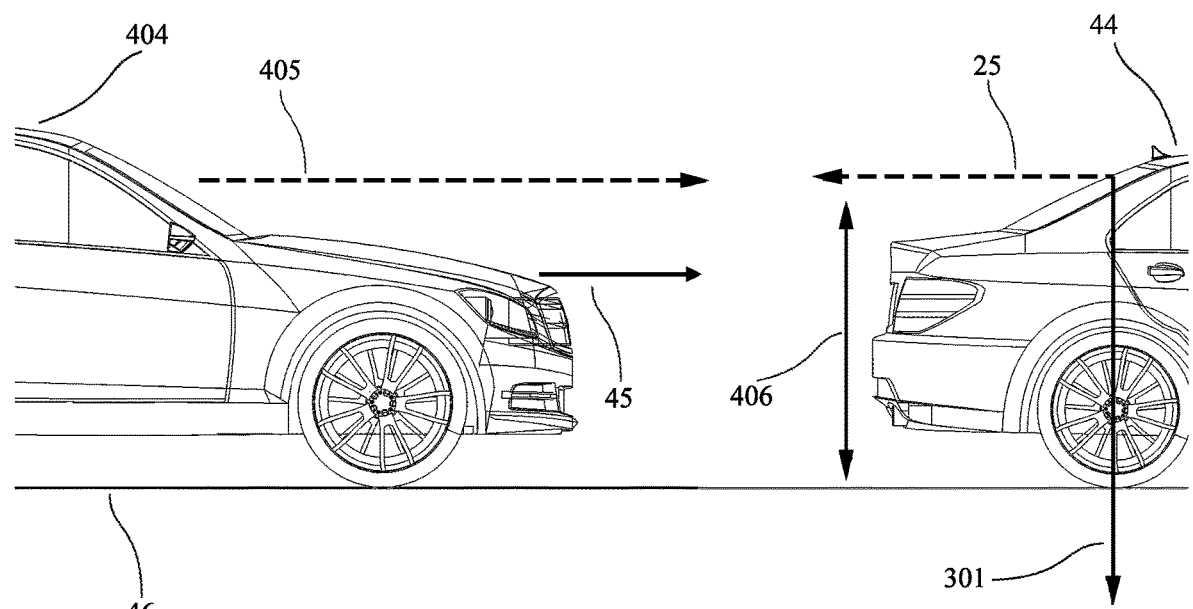
FIG. 24 is a side view of a following vehicle traveling behind the vehicle along a road surface.

FIG. 24 is a side view of a following vehicle 404 traveling behind the vehicle 44 along the road surface 46. The following vehicle 404 is traveling in the same direction 45 as the vehicle 44. The following vehicle 404 has an operator with a line-of-sight 405 that is such that the emissions from the brake lamp 37 are visible to the operator of the following vehicle 404. This is because the brake lamp 37 has light output in a direction 25 that is parallel to the road surface 46 and in line with the line of sight of the operator of the following vehicle 404. For this reason, it is advantageous to not restrict the collimated light output —as depicted by the wireframe of collimated light output 24—of the brake lamp 37 too much. Otherwise, if the light output direction does not line up perfectly with the line of sight of the operator of the following vehicle 405, the deceleration signal may not be observable to the operator of the following vehicle 404.

To improve the visibility of the signal of deceleration from the brake lamp 37, it is preferable to install the apparatus 42 near the top 402 of the rear window 43, such that the distance 406 from the apparatus 42 to the road surface 46 is maximized. This means positioning the apparatus 42 such that it is installed to a space distant from the road surface 46 and on the rear window 43. This is especially important for protection against rear-end collisions from a following vehicle 404 that is larger, such as a Sport Utility Vehicle or truck. Since the operator of this following vehicle 404 will have a line of sight 405 that is more distant from the road surface 46, it is important that the apparatus 42 is also a similar distance 406 from the road surface 46. This ensures that the line of sight 405 of an operator of the following vehicle 404 is still closely in line with the direction of light output 25 from the apparatus 42.

When the vehicle 44 is traveling at a constant speed on a road surface 46 that is ideal, the accelerometer 60 measures only acceleration due to gravity 301. When the vehicle 44 decelerates, the accelerometer 60 also senses an acceleration in the direction opposite the primary direction of travel 45. Thus, the vector of the braking of the vehicle 44 is also parallel to the direction of the light output 25 of the brake lamp 37.

Figure 25:
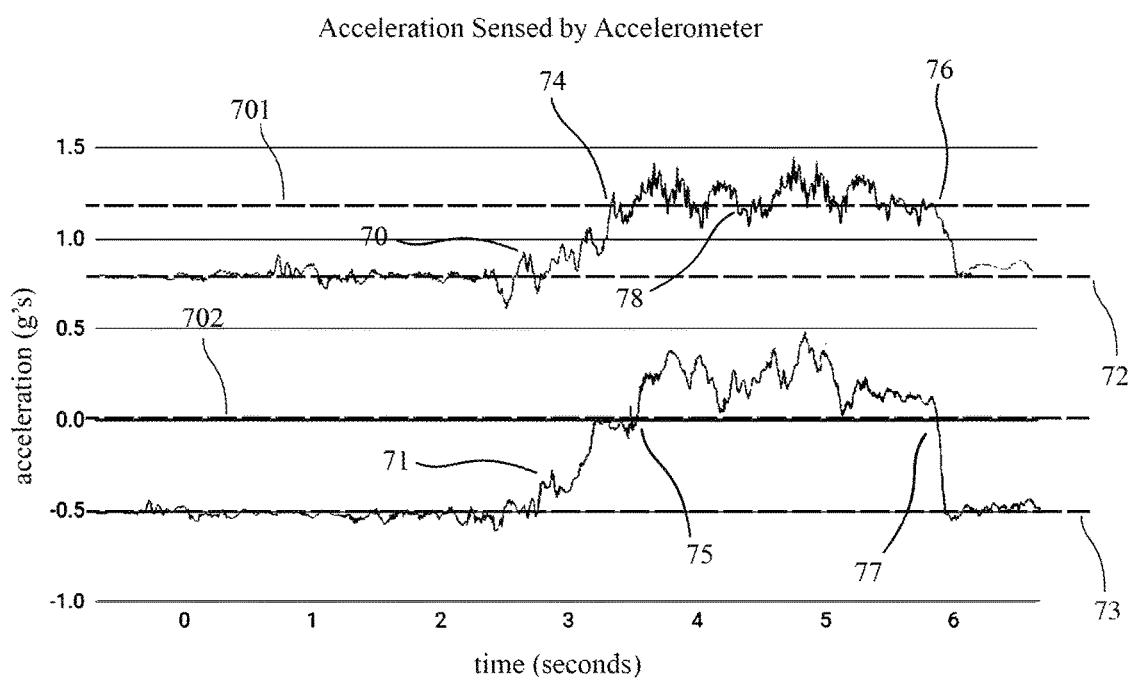
FIG. 25 is an exemplary graph of acceleration vs time, sensed by a two-axis accelerometer.

FIG. 25 is an exemplary graph of acceleration vs time, sensed by a two-axis accelerometer 60. It depicts acceleration, measured in units of gravity, g, vs time, measured in seconds. While a two-axis accelerometer 60 is used, a three-axis accelerometer could be used as well. Alternatively, a single-axis accelerometer could be used, however it would provide substantially less data on which to determine whether the braking threshold has been reached.

Preferably, a multi-axis accelerometer 60 is used and configured such that two of its measurable axes are on the same plane as plane formed by gravity 301 and the primary direction of travel 45. In such configuration, the accelerometer 60 can measure acceleration of the vehicle 44, but does not need to be installed in any specific orientation to do so. Since the angle 401 of the rear window 43 varies with each type of vehicle 44, the orientation of the accelerometer 60 varies when the apparatus 42 is installed. As a result, once the apparatus 42 is positioned on the rear window 43, the orientation of the accelerometer 60 relative to the primary direction of motion 45 must then be defined 55.

To define the axes of the accelerometer 60, a baseline is first set. For an exemplary vehicle 44 with an exemplary rear window 43 angle 401 of 30 degrees and accelerometer 60 measuring readings according to its exemplary origin 7, the z-axis 70 of the accelerometer 60 measures a z-axis baseline 72 reading of 0.9 g which is 1 g*sin 60 degrees. Meanwhile, the x-axis 71 of the accelerometer 60 measures an x-axis baseline 73 reading of −0.5 g which is 1 g*sin−30 degrees. These are the baseline readings of the accelerometer 60 when the vehicle 44 is not moving and so only gravity 301 is applied.

A braking threshold must be chosen that, when exceeded, will lead to the processor 61 activating the brake lamp 37. An exemplary threshold of rapid deceleration is 0.6 g. In other words, when the deceleration of the vehicle 44 is at least 0.6 g in the direction opposite the primary direction of travel 45, the braking threshold will have been crossed and the brake lamp 37 is to be activated.

Upon braking, there will be two acceleration vectors acting on the vehicle 44 and thus the apparatus 42: gravity 301 and deceleration. These two vectors can be combined to find the resultant vector that, when sensed by the accelerometer 60, indicates rapid braking is occurring. When the vehicle 44 is not moving, only gravity 301 is acting on the accelerometer 60. Gravity 301 causes component readings of 0.9 g for the z-axis baseline 72 and −0.5 for the x-axis baseline 73. To then find the threshold for rapid deceleration of the vehicle 44 along the x-axis 71 and z-axis 70, in units of gravity, g, we add this measured gravity vector to the desired threshold of deceleration vector.

Since the window angle 401 is 30 degrees, the 0.6 g deceleration threshold felt along the z-axis 70 is 0.6 g*sin 30 degrees=0.3 g. For the x-axis 71, the 0.6 g deceleration is felt as 0.6 g*sin 60 degrees=0.5 g. By adding this vector to the baseline vector due to gravity, we find that the desired 0.6 g deceleration threshold leads to a measured acceleration reading of 0.9 g+0.3 g=1.2 g along the z-axis 70 and −0.5 g+0.5 g=0 g along the x-axis 71.

Thus, the z-axis threshold 701 is 1.2 g and the x-axis threshold 702 is 0 g. When the accelerometer 60 senses these values on the respective axes, it means that the deceleration of the vehicle 44 is at or above the threshold for rapid deceleration. The processor 61 can then further analyze the readings of the accelerometer 60. Such analysis can verify that these readings are indeed from rapid braking, as opposed to a different movement event such as hitting a pothole, turning, being bumped by a passenger, or crashing, etc.

When the z-axis 70 reading surpasses 74 the z-axis threshold 701 and the x-axis 71 reading surpasses 75 the x-axis threshold 702, the deceleration of the vehicle 44 has surpassed the threshold. Once the vehicle 44 is no longer decelerating rapidly, the z-axis 70 reading will fully drop below 76 the threshold, and the x-axis 71 reading will fully drop below 77 the threshold as well. However, due to noise in the signal, or imperfections in the road surface 46, the measured values of deceleration may briefly drop below the thresholds, even during braking.

For example, the z-axis 70 readings surpassed 74 the z-axis threshold 701, but then briefly dropped 78 below the z-axis threshold 701 before the vehicle 44 eventually ceased its braking. At that point, the z-axis 70 readings fully dropped below 76 the z-axis threshold 701 back to the z-axis baseline 72 readings indicating that there is no longer any braking. To prevent any flickering in illumination of the brake lamp 37 during these threshold crossings, the electronic circuitry can implement hysteresis. Such hysteresis can be digitally built into the processor 61, or physically put in-circuit. Additionally, the processor 61 can smooth the output readings of the accelerometer 60 and make any other modifications necessary to better the ability of the processor 61 to determine when the vehicle 44 is decelerating.

By utilizing a two-axis accelerometer 60, the apparatus 42 can determine the 44 deceleration of the vehicle 44 with significant accuracy and response time, regardless of orientation caused by the angle 401 of the rear window 43. By increasing the frequency of the data output of the accelerometer 60, for instance, to 400 hz, the response time of the apparatus 42 to a deceleration of the vehicle 44 can be even faster.

Since the graph of FIG. 25 is only exemplary, it will vary, particularly based on the condition of the road surface 46, speed of the vehicle 44, type of vehicle 44, and acceleration of the vehicle 44.

ALTERNATIVE EMBODIMENTS

In the disclosed, best mode, the apparatus 42 is constructed with a focus on increasing useability, functionality, and commercial potential. However, as noted by those with ordinary skill in the art, there are alternative ways of constructing the apparatus 42 such that its full potential can be realized.

For example, the housing 8 consists of two parts, the front housing 3 and the back housing 2. Separating the housing 8 into two pieces aids in manufacturing, as the final product can be more easily injection molded. However, the housing 8 can be comprised of only one part, or several pieces as well, to adapt the apparatus 42 to various use cases. For example, a more ruggedized version may use aluminum instead of plastic, further enabling a unibody design. Additionally, the housing 8 can be comprised of more pieces which enables greater compartmentalization of the internal components.

The described mount is in the form of a pair of adhesive pads 1, but such mount could also be one or more screws, clips, suction devices or other means of securing the apparatus 42 to the vehicle 44. A combination of these types of mounts can be used as well. For example, an adhesive pad may support a clip that then clips into the housing 8. A suction device, such as a suction cup, can also attach the apparatus to the rear window 43. These solutions provide the advantage of making the apparatus 42 easily removable. A screw can connect the apparatus 42 directly to the window as well.

Installation to the interior 48 of the rear window 43 helps protect the apparatus 42 from the weather, harsh environments, and theft. However, installation to the exterior 47 of the rear window 43 also has advantages: instead of going through the window tint of a vehicle 44, the light output from the brake lamp 37 can pass directly to the driver of the following vehicle 404. As such, the LEDs 201 in the brake lamp 37 do not need to be illuminated as brightly, which increases longevity of the LEDs 201 and reduces cost. Also, an external installation to the vehicle 44 may help minimize any reduction in visibility the driver of the vehicle 44 experiences, by further removing the apparatus 42 from the driver's line of sight out the rear window 43. Alternatively, the apparatus 42 can be installed to different parts of the interior 48 of the rear window 43. Instead of installing the apparatus 42 near the top 402 of the rear window 43, it can be installed near the bottom of the rear window 43, or to another location. Such location may further reduce visual impairment through the rear window 43 by the driver of the vehicle 44, depending on the particular vehicle 44.

The best mode utilizes a brake lamp 37 to signal deceleration. However, another type of lamp could be used as well, and it could signal other events than simply deceleration of the vehicle 44. The brake lamp 37 is a type of lamp.

The apparatus utilizes a battery 10 in the best mode. However, a battery 10 is merely one type of power supply, and a variety of power supplies could be used instead. For example, a solar cell could draw energy from the solar radiation 41 that otherwise passes through the rear window 43 and is absorbed or reflected by the apparatus 42. Capacitors and supercapacitors can store and release energy as well. One benefit of using a solar cell, a capacitor, a supercapacitor, or a combination of the three, is that they are often safer at higher temperatures. Thus, these two technologies are an option when selecting a power supply capable of safe operation in 90 degree Celsius environments. Also, if employed, the battery 10 need not be lithium-based; as battery technologies continue to improve, a technology more suitable for longer life and safety may come to market and may be advantageous.

The user interface 63 has three slide switches and a tactile switch, however these can be modified as well. For example, instead of a CALIBRATE tactile switch 15, the user interface 63 could combine this functionality with the ON-OFF slide switch 12. In such case, turning on the electronic circuitry of the apparatus 42 would cause the system to automatically define 55 the orientation of the accelerometer 60. Alternatively, the orientation of the accelerometer 60 can be predefined by the factory.

The accelerometer 60 is preferably a three-axis accelerometer, but fewer axes can be used as well. However, using an accelerometer with fewer axes will result in less data from which to draw information about the braking status of the vehicle 44. This is particularly true when the angle 401 of the rear window 43 is not 90 degrees, as both the vectors of acceleration due to gravity 301 and deceleration of the vehicle 44 will not be parallel to the axes of the accelerometer 60.

The processor 61 is a type of standalone processing arrangement. However, instead of a processor 61, a signal filter, such as a low pass signal filter, could be utilized. Also, the processor 61, lamp controller 62, and accelerometer 60 are described as separate items in the primary embodiment. However, as will be familiar to one with ordinary skill in the art, integrated circuits are often combined to varying degrees. For example, the accelerometer 60 may have a built-in processor. Such a processor could be pre-programmed by the factory or by another processor to wait for one or more particular deceleration thresholds to be exceeded then to activate to wake another processor. Such a design could save power by allowing one or more processors to sleep while only the accelerometer checks for deceleration. Alternatively, the processor 61 may have the lamp controller 62 built-in.

Furthermore, the tasks required to be completed by the acceleration sensor, processing arrangement, and lamp controller 62 could be divided amongst multiple integrated circuits such as is the case with the accelerometer 60, the processor 61, and a MOSFET transistor.

In the best mode, the rubber o-ring 21 serves as a frictional surface that helps to keep the brake lamp 37 in a fixed orientation. However, the rubber o-ring 21 is so chosen because of its ease of manufacturing and compressibility; another frictional surface can be chosen instead, or the plastic of the pivot 20 itself can be used as a frictional surface to prevent rotation 31 of the brake lamp 37. If plastic is used, it is advantageous to texture the plastic such that it will have a large frictional force 302 to oppose the rotation 31 of the brake lamp 37. Another such frictional lock could be comprised of a screw that twists into the pivot 20 of the brake lamp 37. Said screw may apply a frictional force 302 such that the brake lamp 37 is held in place securely upon application of the screw.

Several of the steps in operation of the apparatus 42, as depicted in FIG. 22, can occur concurrently. For example, the steps: turn on 50, choose brightness 51, choose response mode 52, choose installation location 53, adjust lamp 54, and define orientation 55 can happen in any order, or concurrently. Additionally, the steps of choosing the brightness 51 and choosing the response mode 52 can be omitted entirely, as they only provide additional flexibility to adapt the apparatus 42 to a wide variety of vehicles. However, if such flexibility is not needed, then these steps can be removed.

Also, instead of a HIGH-LOW slide switch 13, the apparatus 42 could utilize another means of ascertaining the desired output brightness level. Such means could be a programmable entry into the processor 61, via a keyboard or wireless signal, that allows for precise brightness control rather than simply a high or low option via the switch. Alternatively, a light sensor affixed to the apparatus 42 could determine the tint of the rear window 43 during installation automatically and adjust the target output brightness accordingly.

The accelerometer 60 is an acceleration sensor. However, the accelerometer 60 can be substituted for another acceleration sensor like a GPS sensor equipped to determine acceleration, or a wireless receiver. Such wireless receiver can be configured to receive acceleration data from a wireless transmitter that transmits said acceleration data gathered from a source such as an OBD-II port in the vehicle 44, a GPS in the vehicle 44, a smartphone held within the vehicle 44, etc.

The response modes that are disclosed in the best mode and controlled by the PULSE-STEADY slide switch 14, are examples of only two of the options for the response mode. Alternatively, the brake lamp 37 could pulse light at a frequency of other than 5 hz, activate for only a preset amount of time before deactivating, or gradually change in illumination, for example. Furthermore, the threshold that triggers the activation of the brake lamp 37 can be changed as well. The best mode indicates that only rapid deceleration causes illumination. This saves battery 10 power as selecting a more stringent threshold for activation would activate the brake lamp 37 less often, thereby saving power and prolonging the life of the battery 10. However, the threshold can be adjusted, either by the user via a setting option in the user interface 63, or by the factory pre-programmed beforehand. Additionally, multiple thresholds can be used that each elicit a different response by the processor 61 depending on the acceleration values read. For example, during minor deceleration, the brake lamp 37 can illuminate dimly, but for a rapid acceleration the brake lamp 37 could pulse brightly.

The low battery indicator 16 is a blinking LED in the primary embodiment, however this indicator could be audible as well. Using a buzzer instead of an LED for the low battery indicator 16 can alert the driver of the vehicle 44 to a depletion of the battery 10 more quickly, since the apparatus 42 would no longer need to wait until the driver presses the CALIBRATE tactile switch 15 to see if the battery 10 is low.

The best mode also is centered around the deceleration of the vehicle 44, but the apparatus 42 can also alert drivers to positive acceleration of the vehicle 44 along its primary direction of travel 45. The apparatus 42 can alternatively be secured to the front window instead of the rear window 43. Also, the apparatus 42 can signal deceleration of the vehicle 44 to multiple entities, not just to a single driver in a single following vehicle 404. For example, the signal can also alert computer systems in following vehicles, passengers of following vehicles, or pedestrians. Lastly, the color of the LEDs 201 can vary. Red LEDs are perhaps best indicative of braking, but other LEDs such as yellow or white, can be used instead to signal other acceleration events.

The best mode of the invention is such that the user, an ordinary driver, can install the apparatus 42 to the vehicle 44.

However, the apparatus 42 can also be installed by others as well, such as the manufacturer, retailer, dealer, repair shop, or distributor of the vehicle.

The invention claimed is:

1. An apparatus for signaling an acceleration event in a vehicle that has one or more rear windows, travels along a road surface, and has a primary direction of travel, the apparatus comprising:
   a housing;
   an acceleration sensor capable of gathering an acceleration data;
   a lamp carried by the housing;
   a pivot enabling the lamp to rotate independently of the housing about an axis that passes through the housing;
   a power supply;
   a processing arrangement coupled to the acceleration sensor and the power supply and configured to receive and process the acceleration data;
   a lamp controller connected to the lamp and processing arrangement, which is operated by the processing arrangement and capable of powering the lamp via the power supply; and a mount located on the housing capable of securing the housing to a location on the one or more rear windows of the vehicle;
   a lock securing the lamp in a fixed orientation relative to the housing,
   wherein the lock is created by a torque opposing the rotation of the lamp about the axis that passes through the housing, the torque generated by a force of static friction exerted by a frictional surface supported by the housing, the frictional surface having a moment arm about the axis that passes through the housing.

2. The apparatus of claim 1, wherein the mount comprises one or more items selected from a list consisting of: a screw, an adhesive pad, a suction device, and a clip.

3. The apparatus of claim 1, wherein the housing has a transparent portion such that light emissions from the lamp are able to pass through said transparent portion.

4. The apparatus of claim 1, wherein the power supply comprises one or more items selected from a list consisting of: a lithium battery, a solar cell, a supercapacitor, and a capacitor.

5. The apparatus of claim 1, wherein the lamp comprises one or more items selected from a list consisting of: a light emitting diode and a collimating, lens.

6. The apparatus of claim 1, wherein the fixed orientation is such that the lamp emits light in a direction parallel to the road surface when the lamp is secured in said fixed orientation.

7. The apparatus of claim 1, wherein the lamp has a center of gravity that is a distance from the axis that passes through the housing, the distance less than that of one radius of the pivot.

8. The apparatus of claim 1, wherein the location on the one or more rear windows is distant from the road surface.

9. The apparatus of claim 1, wherein the acceleration sensor is a multi axis accelerometer.

10. The apparatus of claim 1, wherein the axis that passes through the housing is normal to a direction of terrestrial gravity and to the primary direction of travel.

11. The apparatus of claim 1, wherein the lamp is at least partially contained within the housing.

12. The apparatus of claim 1, further comprising a threshold employed by the processing arrangement, the processing arrangement comparing the threshold to the acceleration data to determine an occurrence of the acceleration event, the processing arrangement instructing the lamp controller to power the lamp upon the occurrence of the acceleration event.

13. The apparatus of claim 1, further comprising a leveling arm capable of engaging the lamp and rotating the lamp relative to the housing such that the lamp emits light in a direction parallel to the road surface.

14. The apparatus of claim 1, wherein the acceleration event is a rapid braking of the vehicle.

15. An apparatus for signaling an acceleration event in a vehicle that has one or more rear windows, travels along a road surface, and has a primary direction of travel, the apparatus comprising:
   a housing;
   an acceleration sensor capable of gathering an acceleration data;
   a power supply carried by the housing and safe for operation in environments of 90 degrees Celsius for a duration of at least four consecutive hours;
   an acceleration sensor capable of gathering an acceleration data;
   a processing arrangement coupled to the acceleration sensor and the power supply and configured to receive and process the acceleration data;
   a lamp carried by the housing;
   a lamp controller connected to the lamp and processing arrangement, which is operated by the processing arrangement and capable of powering the lamp via the power supply; and a mount located on the housing capable of securing the housing to a location on the one or more rear windows of the vehicle, the location on a side of the one or more rear windows farther along the primary direction of travel;
   a pivot enabling the lamp to rotate independently of the housing about an axis that passes through the housing;
   a lock securing the lamp in a fixed orientation relative to the housing,
   wherein the lock is created by a torque opposing the rotation of the lamp about the axis that passes through the housing, the torque generated by a force of static friction exerted by a frictional surface supported by the housing, the frictional surface having a moment arm about the axis that passes through the housing.

16. The apparatus of claim 15, wherein the lamp comprises one or more items selected from a list consisting of: a light emitting diode and a collimating lens.

17. The apparatus of claim 15, wherein the mount comprises one or more items selected from a list consisting of a screw, an adhesive pad, a suction device, and a clip.

18. The apparatus of claim 15, wherein the axis of rotation is normal to a direction of terrestrial gravity and to the primary direction of travel.

19. The apparatus of claim 15, wherein the power supply comprises one or more items selected from a list consisting of: a lithium battery, a solar cell, a supercapacitor, and a capacitor.

20. The apparatus of claim 15, wherein the location is distant from the road surface.

21. The apparatus of claim 15, wherein the acceleration sensor is a multi axis accelerometer.

22. The apparatus of claim 15, further comprising a threshold employed by the processing arrangement, the processing arrangement comparing the threshold to the acceleration data to determine an occurrence of the acceleration event.

23. The apparatus of claim 15, wherein the acceleration event is a rapid braking of the vehicle.

24. A method of signaling that an acceleration of a vehicle has surpassed a threshold using an apparatus, the apparatus comprising a housing; an acceleration sensor capable of gathering an acceleration data; a lamp carried by the housing; a pivot enabling the lamp to rotate independently of the housing about an axis that passes through the housing; a power supply; a processing arrangement coupled to the acceleration sensor and the power supply and configured to receive and process the acceleration data; a lamp controller connected to the lamp and processing arrangement, which is operated by the processing arrangement and capable of powering the lamp via the power supply; and a mount located on the housing capable of securing the housing to a location on the one or more rear windows of the vehicle; a lock securing the lamp in a fixed orientation relative to the housing, wherein the lock is created by a torque opposing the rotation of the lamp about the axis that passes through the housing, the torque generated by a force of static friction exerted by a frictional surface supported by the housing, the frictional surface having a moment arm about the axis that passes through the housing, the vehicle having one or more rear windows and traveling along a road surface, the method comprising:

- mounting the apparatus for signaling the acceleration to a location on the one or more rear windows of the vehicle;
- rotating the lamp such that the lamp emits light in a direction parallel to the road surface;
- powering the processing arrangement via the power supply;
- gathering the acceleration data about the vehicle via the acceleration sensor;
- processing the acceleration data via the processing arrangement; and
- providing power to the lamp if the processing arrangement dctcnnincs the acceleration of the vehicle exceeds the threshold.

25. The method of claim 24, wherein the threshold is indicative of a braking of the vehicle or a rapid braking of the vehicle.

* * * * *